US012737912B2

(12) United States Patent
Liu et al.

(10) Patent No.: US 12,737,912 B2
(45) Date of Patent: Sep. 15, 2026

(54) METHOD FOR REAL-TIME DETECTION OF LENGTH AND WIDTH SIZE DISTRIBUTION OF CRYSTAL POPULATION IN GLASS CRYSTALLIZER BY BINOCULAR TELECENTRIC CAMERAS

(71) Applicant: DALIAN UNIVERSITY OF TECHNOLOGY, Dalian (CN)

(72) Inventors: Tao Liu, Dalian (CN); Yongcan Shuang, Dalian (CN); Ji Fan, Dalian (CN); Shoulin Hao, Dalian (CN); Tingman Yan, Dalian (CN); Luyao Yan, Dalian (CN); Haibo Niu, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 19/265,775

(22) Filed: Jul. 10, 2025

(65) Prior Publication Data

US 2026/0073548 A1 Mar. 12, 2026

Related U.S. Application Data

(63) Continuation of application No. PCT/CN2025/080718, filed on Mar. 5, 2025.

(30) Foreign Application Priority Data

Jul. 26, 2024 (CN) ......................... 202411012710.6

(51) Int. Cl.
*G06T 7/62* (2017.01)
*G06T 7/80* (2017.01)
(Continued)

(52) U.S. Cl.
CPC .................. *G06T 7/62* (2017.01); *G06T 7/85* (2017.01); *H04N 13/239* (2018.05); *H04N 13/246* (2018.05); *G06T 2207/10012* (2013.01)

(58) Field of Classification Search
CPC ........................................................ G06T 7/62
(Continued)

(56) References Cited

U.S. PATENT DOCUMENTS

2020/0336733 A1* 10/2020 Frevert ................ G02B 26/124
2022/0309710 A1* 9/2022 Li ............................ G06T 3/00

* cited by examiner

*Primary Examiner* — Yulin Sun

(74) *Attorney, Agent, or Firm* — Muncy, Geissler, Olds & Lowe, P.C.

(57) ABSTRACT

A method for real-time detection of length and width size distribution of a crystal population in a glass crystallizer by binocular telecentric cameras. A calibration pole that can extend into an in-situ environment (reactor/glass tube) is designed; a binocular telecentric stereo vision imaging model is established; a simple calibration method of a rotating calibration pole suitable for an in-situ limited space and a calibration plate design solution are proposed. A simplified telecentric stereo epipolar rectification method is also provided to ensure the accurate matching of in situ snapshot image pairs. A three-dimensional reconstruction method by ray intersection based on analytical solutions is provided to measure the three-dimensional postures of particles in a crystallizer. Finally, the three-dimensional length and width are quantitatively evaluated through the statistical data of the Euclidean distances of length and width feature point pairs of crystals.

2 Claims, 9 Drawing Sheets

(51) Int. Cl.
*H04N 13/239* (2018.01)
*H04N 13/246* (2018.01)

(58) Field of Classification Search
USPC .............................................................. 348/47
See application file for complete search history.

METHOD FOR REAL-TIME DETECTION OF LENGTH AND WIDTH SIZE DISTRIBUTION OF CRYSTAL POPULATION IN GLASS CRYSTALLIZER BY BINOCULAR TELECENTRIC CAMERAS

CROSS REFERENCE TO RELATED APPLICATIONS

This application is a Continuation of co-pending Application No. PCT/CN2025/080718, filed on Mar. 5, 2025, for which priority is claimed under 35 U.S.C. § 120; and this application claims priority of application No. 202411012710.6 filed in China on Jul. 26, 2024 under 35 U.S.C. § 119: the entire contents of all of which are hereby incorporated by reference.

TECHNICAL FIELD

The present invention belongs to the technical field of industrial process control and detection, and relates to a method for real-time monitoring of length and width size distribution of a crystal population in a glass crystallizer by binocular telecentric cameras.

BACKGROUND

The process and the control technology of a crystallization process have very important effect and significance for the high-quality development of the advanced manufacturing field. Over the past few decades, imaging systems have been increasingly used for measuring particle sizes in various crystallization processes in laboratory-scale and industrial-scale crystallizers. There are few domestic and foreign literatures and patents on the influence of refraction generated by propagation in a cross-medium optical system, such as a glass crystallizer filled with solution and a glass jacket for heat exchange.

To ensure the in situ measurement accuracy of the particle sizes based on microscopic image analysis, it is crucial to establish an accurate camera calibration model. However, compared with the existing calibration methods of pinhole imaging systems, the calibration of telecentric systems has not been adequately researched in the past few years. With respect to the problem of deformation measurement using telecentric lenses, a simple calibration method based on linear fitting is proposed, which actually does not consider lens distortion and can only obtain the magnification of internal parameters. Li has proposed a planar pattern calibration method for imaging using a single telecentric lens in the international journal of optics "Optics and Lasers in Engineering", but failed to solve the ambiguity problem of external parameters. Further, Chen et al. have developed a calibration method for providing Z-axis translation displacement for a calibration pattern through a micropositioning table, which can solve the problem of sign ambiguity in a calibration process based on planar patterns. Liu et al. have proposed a two-step calibration method based on a three-dimensional calibration plate in the international journal "Optics Express". However, due to the very limited accuracy of the three-dimensional calibration mode, a planar calibration mode is still required. To adapt to the limited in situ space of motion of a calibration target, Cheng et al. have proposed a simplified telecentric camera calibration method without auxiliary device in the top journal "IEEE Transactions on Instrumentation and Measurement", which solves the related sign problems by using a Scheimpflug telecentric model similar to a specific pinhole camera model. For telecentric systems that do not have Scheimpflug properties, this strategy may be ineffective for telecentric systems without the property of Scheimpflug, and thus provoke a higher reprojection error. In addition, the above calibration method requires an auxiliary device for in situ calibration. In a limited in situ calibration motion space, how to achieve accurate calibration and reconstruction simply and quickly remains a challenging problem.

In the measurement of crystal sizes in the crystallization process, at present, there are few literature reports on in situ detection image analysis methods that can be practically applied. Gao and Cardona et al. have proposed an ellipse fitting method for measuring different crystal shapes in the top international chemical engineering journals "Crystal Growth & Design" and "Chemical Engineering Science". These methods are limited to measurement of crystal size distribution (CSD) based on two-dimensional image projection. Zhang and Huo et al. have developed a simplified three-dimensional geometric model of crystal morphology to calculate the crystal sizes in a volumetric space and published it in an international chemical engineering journal. However, the accuracy of these methods depends on the identified key feature points to construct the geometric model. Fan et al. have proposed a size measurement technique based on reconstruction of key corner points of crystal images in the top journal "IEEE Transactions on Instrumentation and Measurement". However, how to accurately obtain the geometric information of crystals in a three-dimensional space to accurately measure CSD and the surface area has still been a problem to be solved up to now.

SUMMARY

Technical problems to be solved in the present invention are the problems of in situ calibration for the refraction effect of a reactor medium on an optical system during detection and the three-dimensional length and width size measurement of the crystal during crystallization. To solve the above problems, an in situ calibration pole design solution, an imaging calibration modeling method of binocular telecentric cameras and a telecentric stereo vision three-dimensional reconstruction technical method based on analytical solutions are systematically proposed, to achieve in situ online detection of three-dimensional length and width of crystals in a solution.

The present invention adopts the following technical solution:

A method for real-time detection of length and width size distribution of a crystal population in a glass crystallizer by binocular telecentric cameras is provided. The method is implemented based on a non-contact high-resolution backlit calibration pole to ensure that two telecentric cameras synchronously collect images of a crystal solution in a reactor, thereby measuring the three-dimensional size of crystals. The used backlit calibration pole is composed of a light-emitting diode (LED), a ceramic calibration plate printed with a checkerboard pattern, a reflecting prism, an optic fiber and a stainless steel sheath. A light ray emitted by the LED at the top of the calibration pole is guided to the reflecting prism at the bottom of the calibration pole through the optic fiber, and the reflecting prism reflects the light ray vertically to a back surface of the ceramic calibration plate engraved with the checkerboard pattern. Reflected light provides illumination for the shooting of two telecentric cameras. The device can provide sufficient imaging light intensity within short exposure time (such as 36-100 μs), thereby reducing motion blur caused by solution turbulence in the crystallizer and other environmental disturbances. The correction rod is inserted into the glass crystallizer and rotated clockwise or counterclockwise along a pivot to perform in situ calibration. The backlit calibration pole can be assembled into different sizes to apply to the in situ calibration of the crystallizers with different volumes.

The present invention synchronously collects the images in real time by placing a telecentric camera at two different angles respectively outside the reactor. The images are called binocular images and comprise a left view and a right view. For the poses of the binocular cameras, a two-step in situ stereo imaging calibration model is established, comprising calculating the closed-loop solution of camera parameters to obtain the initial values of model parameters and subsequently using optimization algorithms to seek optimal camera model parameters. For the collected binocular images, an analysis method for crystal image matching is proposed, comprising image preprocessing, point of interest detection, feature matching and mismatch removal. After key length and width corner points are detected by using the contour features of the crystals, the three-dimensional reconstruction of the length and width corner points is conducted for each matched crystal through a calibrated stereo imaging model, so as to quantitatively evaluate the three-dimensional size. The method comprises the following specific steps:

Step 1, Stereo Imaging Calibration

The projection of a telecentric camera imaging model, i.e., point $P(x_w, y_w, z_w)$ in a world coordinate system to a pixel coordinate system $P(u, v)$, is expressed as $$\begin{bmatrix} u \\ v \\ 1 \end{bmatrix} = \underbrace{\begin{bmatrix} m & 0 & 0 \\ 0 & m & 0 \\ 0 & 0 & 1 \end{bmatrix}}_{M} \left[ \underbrace{\begin{bmatrix} r_{11} & r_{12} & r_{13} \\ r_{21} & r_{22} & r_{23} \\ r_{31} & r_{32} & r_{33} \end{bmatrix}}_{R} \begin{bmatrix} x_w \\ y_w \\ z_w \end{bmatrix} + \underbrace{\begin{bmatrix} t_x \\ t_y \\ t_z \end{bmatrix}}_{T} \right] = \begin{bmatrix} mr_{11} & mr_{12} & mt_x \\ mr_{21} & mr_{22} & mt_y \\ 0 & 0 & 1 \end{bmatrix} \begin{bmatrix} x_w \\ y_w \\ 1 \end{bmatrix} \quad (1)$$

where m is an effective magnification of a telecentric lens, and R and T are rotation and translation matrices between the two coordinate systems respectively.

(1) Monocular Camera Parameter Calibration:

The world coordinates of the planar calibration plate can be associated with captured image coordinates through a homography matrix H, with a relationship as follows:

$$\begin{bmatrix} u \\ v \\ 1 \end{bmatrix} = \begin{bmatrix} mr_{11} & mr_{12} & mt_x \\ mr_{21} & mr_{22} & mt_y \\ 0 & 0 & 1 \end{bmatrix} \begin{bmatrix} x_w \\ y_w \\ 1 \end{bmatrix} = \underbrace{\begin{bmatrix} h_{11} & h_{12} & h_{13} \\ h_{21} & h_{22} & h_{23} \\ 0 & 0 & 1 \end{bmatrix}}_{\text{homography matrix } H} \begin{bmatrix} x_w \\ y_w \\ 1 \end{bmatrix} \quad (2)$$

For the convenience of analysis, Euler angles are introduced to describe the rotation matrix $R(\alpha, \beta, \theta)$, and $\alpha$, $\beta$, and $\theta$ are rotation angles around X-axis, Y-axis, and Z-axis of the coordinate system respectively. Corresponding elements of the rotation matrix are described as:

$$\begin{cases} r_{11} = \cos(\beta)\cos(\theta) \\ r_{12} = \cos(\beta)\sin(\theta) \\ r_{21} = \cos(\theta)\sin(\beta)\sin(\alpha) - \cos(\alpha)\sin(\theta) \\ r_{22} = \sin(\theta)\sin(\beta)\sin(\alpha) - \cos(\theta)\cos(\alpha) \end{cases} \quad (3)$$

By making the corresponding elements of a 3×3 matrix in (2) equal, the following equation can be easily established:

$$\begin{cases} m\cos(\beta)\cos(\theta) = h_{11} \\ m\cos(\beta)\sin(\theta) = h_{12} \\ m(\cos(\theta)\sin(\beta)\sin(\alpha) - \cos(\alpha)\sin(\theta)) = h_{21} \\ m(\sin(\theta)\sin(\beta)\sin(\alpha) - \cos(\theta)\cos(\alpha)) = h_{22} \end{cases} \quad (4)$$

where $\alpha$, $\beta$ and $\theta$ are the rotation angles within the range of $(-\pi/2, \pi/2)$. In addition, an effective magnification factor is defined as a positive value. The solution of the above equation is:

$$\begin{cases} m = \sqrt{0.5\left(-b + \sqrt{b^2 - 4c}\right)} \\ \theta = \arctan(h_{12}/h_{11}) \\ \beta = \pm\arccos\left(\sqrt{h_{11}^2 + h_{12}^2} \,/\, m\right) \\ \alpha = \arcsin\left(\dfrac{h_{22}h_{12} + h_{21}h_{11}}{m\sin\beta\sqrt{h_{11}^2 + h_{12}^2}}\right) \end{cases} \quad (5)$$

where $$b = -\left(h_{11}^2 + h_{12}^2 + h_{21}^2 + h_{22}^2\right), \text{ and } c = (h_{11}h_{22} - h_{12}h_{21})^2.$$

The translation matrix $T(t_x, t_y)$ is calculated as:

$$\begin{cases} t_x = h_{13}/m \\ t_y = h_{23}/m \end{cases} \quad (6)$$

Therefore, the magnification factor m and the Euler angle $\theta$ can be uniquely determined. However, the Euler angles $\alpha$ and $\beta$ have two possible signs, as shown in (5). Therefore, a single-camera coordinate system may have two ambiguous postures related to the world coordinate system, while a binocular camera system may have four ambiguous postures. Recovering the true Euler angles $\alpha$ and $\beta$ is a key to a calibration method of the system.

Due to the orthographic projection characteristics of the above telecentric cameras, the camera postures recovered from a two-dimensional mode have ambiguity. The existing methods depend on a three-dimensional calibration mode with limited accuracy or make full use of external displacement. However, because a physical relationship cannot be established between an imaging target and a stereo vision system, the existing methods cannot be used for in situ calibration of the stereo vision system. To overcome the above difficulties, a novel calibration method using a rotation pattern is proposed here for practical application In the calibration process, a calibration pattern rotates around $Y_w$-axis in a specific angular sequence (clockwise or counterclockwise) to enable the cameras to obtain ordered calibrated shooting images. Therefore, it is observed that the placement angle of the calibration pattern is changed to increase (or decrease) successively. Meanwhile, the rotation angle $\beta$ of the world coordinate system related to the camera coordinate system also monotonically increases (or decreases). For analysis simplicity, it is assumed that the calibration pattern is rotated clockwise around the $Y_w$-axis.

$$m = \frac{1}{N}\sum m^k,\ k = 1, 2, \ldots N \tag{7}$$

Considering that a real rotation angle β is a monotonically increasing sequence, the absolute value of β may present a local minimum point or maintain a monotonic trend. Calculation of the absolute value of angle sequence can check whether there is the local minimum point. If there are multiple local minimum points or local maximum points, the calibration conditions are not met. However, if prescribed conditions are met, it can be inferred that the extreme points occur near a minimum value of a discrete sequence, resulting in $$k^e = \arg\min_k |\beta^k|,\ k = 1, \ldots, N \tag{8}$$

Through a number of discrete $\beta^k$, the extremum point could be determined in the vicinity of the minimum value, such as the left- or right-side of the minimum value. Because the rotation angle β is monotonically increasing, except a sign of the minimum point, the sign is restored by the following equation:

$$\hat{\beta}^k = \begin{cases} -|\beta^k|, & k < k^e \\ |\beta^k|, & k < k^e \end{cases},\ k = 1, 2, \ldots, k^e - 1, k^e + 1, \ldots, N \tag{9}$$

The rotation angle α is restored by the following formula:

$$\hat{\alpha}^k = \frac{\hat{\beta}^k}{\beta^k}\alpha^k,\ k = 1, 2, \ldots, k^e - 1, k^e + 1, \ldots, N \tag{10}$$

(2) Parameter Calibration of Stereo Vision System:

The essence of binocular vision calibration is to obtain a relative positional relationship between two telecentric cameras. The coordinate positional relationship of left and right cameras is described by the rotation matrix $R_C$ and a translation vector $T_C$, that is:

$$\begin{bmatrix} x_c^R \\ y_c^R \\ z_c^R \end{bmatrix} = R_R(R_L)^{-1}\begin{bmatrix} x_c^L \\ y_c^L \\ z_c^L \end{bmatrix} + T_R - R_C T_L = R_C\begin{bmatrix} x_c^L \\ y_c^L \\ z_c^L \end{bmatrix} + T_C \tag{11}$$

where $R_L$ and $T_L$, and $R_R$ and $T_R$ are rotation matrices and transfer vectors related to the world coordinate system and left and right camera coordinate systems respectively.

For each pair of calibrated images, the external matrices of the left and the right cameras undergo changes, while the relative rotation matrix $R_C$ between the left and the right cameras remains invariant. The Euler angle of $R_C$ obtained from the k-th pair of calibrated images is expressed as $$\begin{aligned} R_C^k(\alpha_C^k, \beta_C^k, \theta_C^k) &= R_R^k(\hat{\alpha}_R^k, \hat{\beta}_R^k, \theta_R^k)R_L^k(\hat{\alpha}_L^k, \hat{\beta}_L^k, \theta_L^k)^{-1} \\ &= R_C^k(\hat{\alpha}_R^k - \hat{\alpha}_L^k, \hat{\beta}_R^k - \hat{\beta}_L^k, \theta_R^k - \theta_L^k) \end{aligned} \tag{12}$$

where $\alpha_C$, $\beta_C$ and $\theta_C$ are rotation angles around X-axis, Y-axis and Z-axis of the left camera coordinate system. The rotation Euler angles $\hat{\alpha}_L$, $\hat{\beta}_L$, $\theta_L$ and $\hat{\alpha}_R$, $\hat{\beta}_R$, $\theta_R$ represent external parameters $R_L$ and $R_R$ in the left and right camera coordinate systems. The superscript k represents that the data comes from the k-th group of calibrated images. The Euler angles $\alpha_C$, $\beta_C$ and $\theta_C$ obtained from N pairs of different calibrated images are optimized:

$$\begin{aligned} \alpha_C &= \frac{1}{N_k}\sum \hat{\alpha}_R^k - \hat{\alpha}_L^k,\ k \in \{1, 2, \ldots N\} - \{k_L^e, k_R^e\} \\ \beta_C &= \frac{1^k}{N_k}\sum \hat{\beta}_R^k - \hat{\beta}_L^k,\ k \in \{1, 2, \ldots N\} - \{k_L^e, k_R^e\} \\ \theta_C &= \frac{1}{N}\sum \theta_R^k - \theta_L^k,\ k = 1, 2, \ldots N \end{aligned} \tag{13}$$

where $N_k$ represents the number of variables in a calibrated image set.

The representation form of the calculated Euler angle of the rotation matrix is converted into a matrix representation form $R_C$, and $T_C$ is calculated according to (11) to complete stereo calibration work.

Step 2, Simplified Stereo Rectification

Epipolar rectification plays an important role in precise stereo matching, and simplifies the two-dimensional search of matching points to one-dimensional search. In telecentric stereo vision, the existing methods use a 3×4 matrix for epipolar rectification. In fact, from the perspectives of geometry and physics, rectification parameters can be further simplified to a 3×3 homography matrix, which is more convenient for computer-aided image analysis. A specific method is as follows:

representing the projections of point P from the world coordinate system to left and right camera pixel coordinate systems $p_L$ and $p_R$ respectively as $$\begin{aligned} \begin{bmatrix} p_L \\ 1 \end{bmatrix} &= \mathrm{diag}(m_L\ \ m_L\ \ 1)\begin{bmatrix} R_{L2\times2} & T_{L2\times1} \\ 0_{1\times2} & 1 \end{bmatrix}\begin{bmatrix} P_{2\times1} \\ 1 \end{bmatrix} = H_L\begin{bmatrix} P_{2\times1} \\ 1 \end{bmatrix} \\ \begin{bmatrix} p_R \\ 1 \end{bmatrix} &= \mathrm{diag}(m_R\ \ m_R\ \ 1)\begin{bmatrix} R_{R2\times2} & T_{R2\times1} \\ 0_{1\times2} & 1 \end{bmatrix}\begin{bmatrix} P_{2\times1} \\ 1 \end{bmatrix} = H_R\begin{bmatrix} P_{2\times1} \\ 1 \end{bmatrix} \end{aligned} \tag{14}$$

determining the projections of point P from the world coordinate system to rectified left and right camera pixel coordinate systems respectively as:

$$\begin{aligned} \begin{bmatrix} \hat{p}_L \\ 1 \end{bmatrix} &= \mathrm{diag}(\hat{m}\ \ \hat{m}\ \ 1)\begin{bmatrix} \hat{R}_{L2\times2} & \hat{T}_{L2\times1} \\ 0_{1\times2} & 1 \end{bmatrix}\begin{bmatrix} P_{2\times1} \\ 1 \end{bmatrix} = \hat{H}_L\begin{bmatrix} P_{2\times1} \\ 1 \end{bmatrix} \\ \begin{bmatrix} \hat{p}_R \\ 1 \end{bmatrix} &= \mathrm{diag}(\hat{m}\ \ \hat{m}\ \ 1)\begin{bmatrix} \hat{R}_{R2\times2} & \hat{T}_{R2\times1} \\ 0_{1\times2} & 1 \end{bmatrix}\begin{bmatrix} P_{2\times1} \\ 1 \end{bmatrix} = \hat{H}_R\begin{bmatrix} P_{2\times1} \\ 1 \end{bmatrix} \end{aligned} \tag{15}$$

according to formulas (14) and (15), establishing transformation from original image coordinates to rectified coordinates:

$$\begin{aligned} \begin{bmatrix} \hat{p}_L \\ 1 \end{bmatrix} &= \hat{H}_L H_L^{-1}\begin{bmatrix} p_L \\ 1 \end{bmatrix} = H_L^S\begin{bmatrix} p_L \\ 1 \end{bmatrix} \\ \begin{bmatrix} \hat{p}_R \\ 1 \end{bmatrix} &= \hat{H}_R H_R^{-1}\begin{bmatrix} p_R \\ 1 \end{bmatrix} = H_R^S\begin{bmatrix} p_R \\ 1 \end{bmatrix} \end{aligned} \tag{16}$$

Step 3, Reconstruction and Measurement (1) Three-dimensional reconstruction:

For a telecentric stereo vision system, proposing an improved three-dimensional reconstruction method for light ray intersection based on analytical solutions.

Firstly, constructing the position equations of each ray of $$(x_L^c, y_L^c, z_L^c) \text{ and } (x_R^c, y_R^c, z_R^c)$$

through matching points on left and right physical image planes respectively.

$$\frac{(x_l - x_L^c)}{d_L^x} = \frac{(y_l - y_L^c)}{d_L^y} = \frac{(z_l - z_L^c)}{d_L^z} = \tau_L \tag{17}$$

$$\frac{(x_r - x_R^c)}{d_R^x} = \frac{(y_r - y_R^c)}{d_R^y} = \frac{(z_r - z_R^c)}{d_R^z} = \tau_R \tag{18}$$

where $(x_l, y_l, z_l)$ represents the coordinate of any point on a left image plane light ray;

$$(x_L^c, y_L^c, z_L^c)$$

represents the coordinate of the matching point on the left physical image plane;

$$(d_L^x, d_L^y, d_L^z)$$

represents the unit vector of the direction of a left camera optic axis; $\tau_L$ is a light ray coefficient of a left camera; $(x_r, y_r, z_r)$ represents the coordinate of any point on a right image plane light ray;

$$(x_R^c, y_R^c, z_R^c)$$

represents the coordinate of the matching point on the right physical image plane;

$$(d_R^x, d_R^y, d_R^z)$$

represents the unit vector of the direction of a right camera optic axis; and $\tau_R$ is a light ray coefficient of a right camera. If the computed points on the physical image plane and the location equations of the above rays are precise, there is only one intersection point between the left and right rays for each sampled point on the object surface. However, due to the existence of noise, the left and right light rays may not intersect. To find an optimal intersection point, two points closest to the left ray and the right ray are calculated respectively. Through the calculation of the analytical solutions, the coefficient of the left ray when taking the position of the closest point can be obtained as:

$$\begin{cases} \tau_L = \dfrac{AD + BE}{CD - BF} \\ \tau_R = \dfrac{CE + FA}{CD - BF} \end{cases} \tag{19}$$

where $$A = x_R^c d_L^x + y_R^c d_L^y + z_R^c d_L^z - x_L^c d_L^x - y_L^c d_L^y - z_L^c d_L^z \tag{20}$$

$$B = d_R^x d_L^x + d_R^y d_L^y + d_R^z d_L^z$$

$$C = d_L^{x2} + d_L^{y2} + d_L^{z2}$$

$$D = d_R^{x2} + d_R^{y2} + d_R^{z2}$$

$$E = x_L^c d_R^x + y_L^c d_R^y + z_L^c d_R^z - x_R^c d_R^x - y_R^c d_R^y - z_R^c d_R^z$$

$$F = d_R^x d_L^x + d_R^y d_L^y + d_R^z d_L^z$$

correspondingly, calculating the coordinate of the reconfiguration point by the following formula:

$$\begin{bmatrix} x_w \\ y_w \\ z_w \end{bmatrix} = \frac{1}{2}\left(\begin{bmatrix} x_L^c \\ y_L^c \\ z_L^c \end{bmatrix} + \tau_L \begin{bmatrix} d_L^x \\ d_L^y \\ d_L^z \end{bmatrix}\right) + \frac{1}{2}\left(\begin{bmatrix} x_R^c \\ y_R^c \\ z_R^c \end{bmatrix} + \tau_R \begin{bmatrix} d_R^x \\ d_R^y \\ d_R^z \end{bmatrix}\right) \tag{21}$$

(2) Crystal Image Matching and Measurement:

Firstly, rectifying the images through a rectification method in Step 2, and quickly matching crystal images through one-dimensional search. Then, obtaining a length feature point pair by a distance from a contour to a center point of the contour, connecting the length feature point pair to obtain a crystal spindle, and calculating the projection of the contour on the spindle to obtain a plurality of width feature point pairs. Then, matching the feature point pairs through epipolar constraints and calculating the three-dimensional spatial coordinates of feature points. Finally, taking a distance between the length feature points as a crystal length, voting distances among a plurality of width feature points, and selecting the distance of the width feature point with a highest occurrence frequency as a crystal width to complete the measurement of the length and width sizes of the crystals.

The matching and measurement methods in Step 3 can also be achieved through the following proposed methods:

(1) Crystal Image Matching:

Firstly; rectifying the images through the rectification method in Step 2: subsequently, using a deep learning algorithm (YOLOv8) for crystal segmentation and oriented bounding boxes object detection, and quickly matching the crystal images through one-dimensional search. Then, obtaining a part with linear features on the crystal contour by piecewise fitting using Bezier curves: subsequently, matching y coordinate and the angle directions of line segments between the left and right images, simplifying the matched contour line segments into feature points with weights and achieving three-dimensional reconstruction by using the above reconstruction algorithm.

(2) Establishment of Virtual Imaging Plane:

According to the three-dimensional length of a feature contour represented by the feature points, defining the weights of the feature points as $$w_i^S = w_i^M = w_i^E = \left\| p_i^E - p_i^S \right\| \tag{2-1}$$

where $$w_i^S,\ w_i^M \text{ and } w_i^E$$

represents weights assigned to a starting point, a midpoint and an ending point of an i-th feature contour respectively; and $$p_i^S \text{ and } p_i^E$$

represent a starting point and an ending point of an i-th three-dimensional feature contour.

According to the three-dimensional feature points after weight allocation, fitting a virtual three-dimensional plane where a maximum projection surface of the crystal is located as an imaging plane of a virtual camera, wherein spatial plane parameters $a_p$, $b_p$, $c_p$ and $d_p$ of the virtual plane can be determined by minimizing the following equation.

$$F(a_P, b_P, c_P, d_p) = \sum_{i=1}^{n} w_i(a_P x_i + b_P y_i + c_P z_i + d_P)^2 \tag{2-2}$$

where $(x_i, y_i, z_i)$ is the coordinate of an i-th three-dimensional plane point, $w_i$ is the weight of the three-dimensional plane point, and n is the number of the points. The normal vector of the fitted virtual plane can be expressed as $$\vec{n}_v = \left(\frac{a_P}{\sqrt{a_P^2 + b_P^2 + c_P^2}}, \frac{b_P}{\sqrt{a_P^2 + b_P^2 + c_P^2}}, \frac{c_P}{\sqrt{a_P^2 + b_P^2 + c_P^2}}\right) \tag{2-3}$$

(3) Virtual Camera Projection Imaging:

The projection of a two-dimensional image from a camera imaging plane to a virtual imaging plane is a process of rotation and translation transformation of the imaging planes in a space. Transformation between the camera and the virtual imaging plane is expressed as $$p_v = R_v p_c + t_v = \begin{bmatrix} r_{11}^v & r_{12}^v & r_{13}^v \\ r_{21}^v & r_{22}^v & r_{23}^v \\ r_{31}^v & r_{32}^v & r_{33}^v \end{bmatrix} \begin{bmatrix} x_c \\ y_c \\ z_c \end{bmatrix} + \begin{bmatrix} t_x^v \\ t_y^v \\ t_z^v \end{bmatrix} \tag{2-4}$$

where $p_v$ and $p_c$ are the coordinates of a three-dimensional point in the camera plane and the virtual plane in the space respectively. $R_v$ is a rotation matrix between a normal vector $\vec{n}_v$ of the virtual plane and a normal vector $\tilde{n}_c$, of a binocular camera imaging plane, and $t_v$ is a translation matrix between the two planes. To eliminate perspective distortion and maintain the geometry and the position of each snapshot crystal, the present invention adopts orthogonal projection transformation. Considering $p_c$ as a point on the imaging plane and $Z_c=0$, the transformation from the camera imaging plane to the virtual imaging plane is constructed by eliminating Z coordinates on both sides of formula (2-4)

$$\begin{bmatrix} x_v \\ y_v \\ 1 \end{bmatrix} = \lambda \begin{bmatrix} r_{11}^v & r_{12}^v & t_x^v \\ r_{21}^v & r_{22}^v & t_y^v \\ 0 & 0 & 1 \end{bmatrix} \begin{bmatrix} x_c \\ y_c \\ 1 \end{bmatrix} = \lambda H_v \begin{bmatrix} x_c \\ y_c \\ 1 \end{bmatrix} \tag{2-5}$$

where $H_v$ is a homography matrix, and A is a scaling factor which can be set to 1 because a projection scale is unchanged;

$$r_{11}^v,\ r_{12}^v,\ r_{21}^v \text{ and } r_{22}^v$$

are four elements of $R_v$;

$$t_x^v \text{ and } t_y^v$$

are elements of a translation vector $t_v$.

Making internal parameters of the virtual camera the same as those of a real camera; therefore, the projection transformation from the camera imaging plane to the virtual imaging plane can be represented by the homography matrix $H_v$ $$\tilde{x}_c = H_v x_c \tag{2-6}$$

where $\tilde{x}_c=[\tilde{u}_c, \tilde{v}_c, 1]^T$ and $x_c=[u_c, v_c, \mathbf{1}]^T$ represent homogeneous pixel coordinates of the points on the virtual plane and the camera plane respectively.

(4) Reconstruction Quality Evaluation:

Firstly, conducting homography transformation by using formula (2-6) for affine projection of the images of the left and the right cameras onto the same virtual camera imaging plane. A real projection from a spatial object to the camera imaging plane belongs to three-dimensional orthogonal projection, and the virtual plane coincides with the maximum projection plane of the crystal. Therefore, virtual images obtained by the homography transformation of the images of the above left and right cameras to the same virtual plane should be consistent.

Overlapping and comparing the images in the left and right camera images after homography transformation. In this way, verifying the accuracy of three-dimensional reconstruction through the overlap ratio of the images. If the overlap ratio of the left and right images on the virtual plane is high, a reconstruction result can be considered to be relatively accurate.

An overlap ratio of the images projected from the left and right camera images onto the virtual plane can be calculated as follows $$O_V = \text{sum}(I_V^L \cap I_V^R)/\text{sum}(I_V^L \cup I_V^R) \tag{2-7}$$

where $$I_V^L \text{ and } I_V^R$$

are crystal virtual images restored from the left and right camera images respectively.

(5) Statistical Measurement Based on Virtual Images:

Rotating the segmentation results of the crystal virtual images until the crystal principal axis is perpendicular to the horizontal direction of the images. Decomposing, projecting and analyzing the rotated segmented figures in the horizontal (u-axis) and vertical (v-axis) directions.

$$P_U(\hat{u}_v) = \sum_{\hat{v}_v=1}^{N_V} \hat{I}_V(\hat{u}_v, \hat{v}_v) \tag{2-8}$$

$$P_V(\hat{v}_v) = \sum_{\hat{u}_v=1}^{N_U} \hat{I}_V(\hat{u}_v, \hat{v}_v) \tag{2-9}$$

where $P_U$ is one-dimensional length projection data along u-axis, and $N_V$ is the total number of rows of the rotated crystal image; $P_V$ is 1-D width projection data along v-axis, and $N_U$ is the total number of columns of the rotated crystal image.

Counting the mean, median or maximum values of the length and the width of each crystal image and area respectively as follows $$L_{mean} = \text{mean}(P_V)/m \tag{2-10}$$

$$L_{median} = \text{median}(P_V)/m \tag{2-11}$$

$$L_{max} = \max(P_V)/m \tag{2-12}$$

$$W_{mean} = \text{mean}(P_U)/m \tag{2-13}$$

$$W_{median} = \text{median}(P_U)/m \tag{2-14}$$

$$W_{max} = \max(P_U)/m \tag{2-15}$$

$$\text{Area} = \frac{1}{m^2} \sum_{\hat{u}_v=1}^{N_U} \sum_{\hat{v}_v=1}^{N_V} \hat{I}_V(\hat{u}_c, \hat{v}_c) \tag{2-16}$$

where m is a magnification of the cameras obtained from camera calibration.

Selecting appropriate statistical parameters of the crystal size according to different crystal shape features to complete the measurement of the three-dimensional size of the crystals.

The present invention can achieve in situ calibration and reconstruction of the telecentric stereo vision system, and achieve three-dimensional length and width measurement by reconstructing the crystal feature points, so as to effectively avoid the measurement errors caused by refraction generated by the propagation of light in a cross-medium optical system, and analyze the growth state of the crystals in the crystallization process accurately. The method is highly operable, has low requirements for experience and technologies, can achieve the effects of rapid in situ system calibration and automatic measurement of the three-dimensional size of the crystals, and is convenient for practical industrial application.

DESCRIPTION OF DRAWINGS

FIG. 1(*a*) is an overall schematic diagram, FIG. 1(*b*) is a structural schematic diagram of the calibration pole, and FIG. 1(*c*) is a sectional view of the calibration pole;

DETAILED DESCRIPTION

To better understand the technical solution of the present invention, embodiments of the present invention will be described below in detail in combination with drawings.

The method synchronously collects images in real time by placing a telecentric camera at two different angles respectively outside a reactor at first, inserts a calibration pole into the reactor and rotates the calibration pole clockwise orderly for in situ calibration of a binocular system. Next, a stereo vision epipolar rectification method expressed by a 3×3 matrix is established, and the two-dimensional search of matching points is simplified to one-dimensional search. Finally, each pair of crystal images is matched through a calibrated stereo imaging model and the stereo vision epipolar rectification method, three-dimensional length and width feature points are reconstructed by using a light ray intersection method based on the analytical solutions, and the three-dimensional size is quantitatively evaluated through multiple sets of data.

Figure 1A:
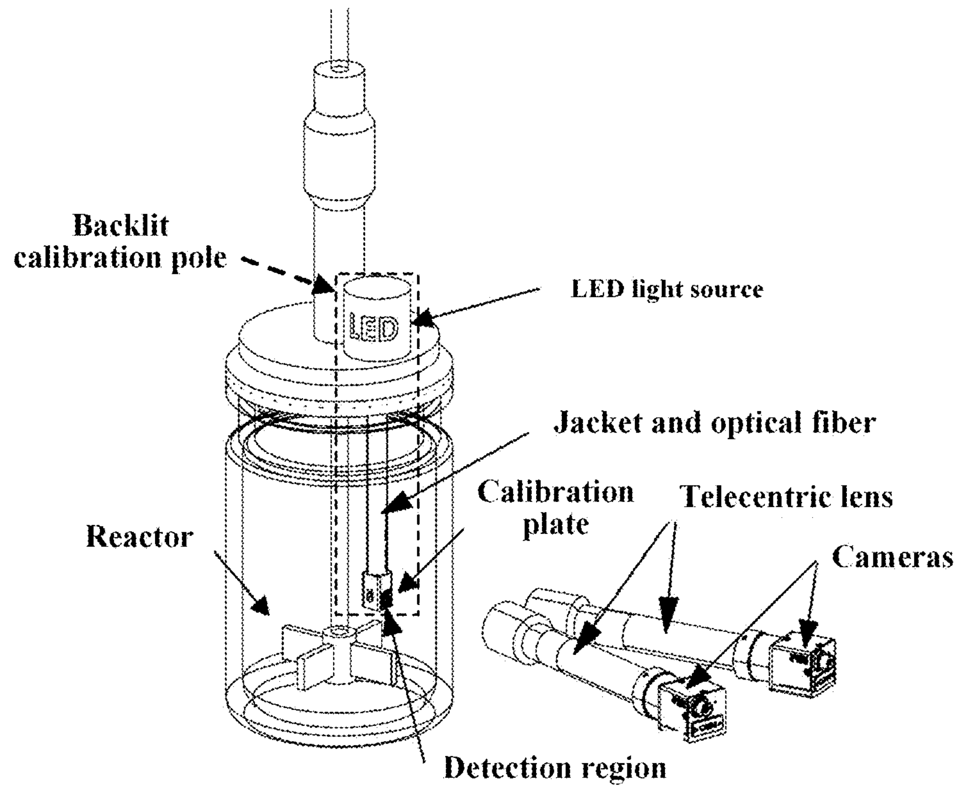
FIGS. 1(*a*)-1(*c*) are schematic diagrams of an application scenario and a calibration pole of the present invention.
Figure 1B:
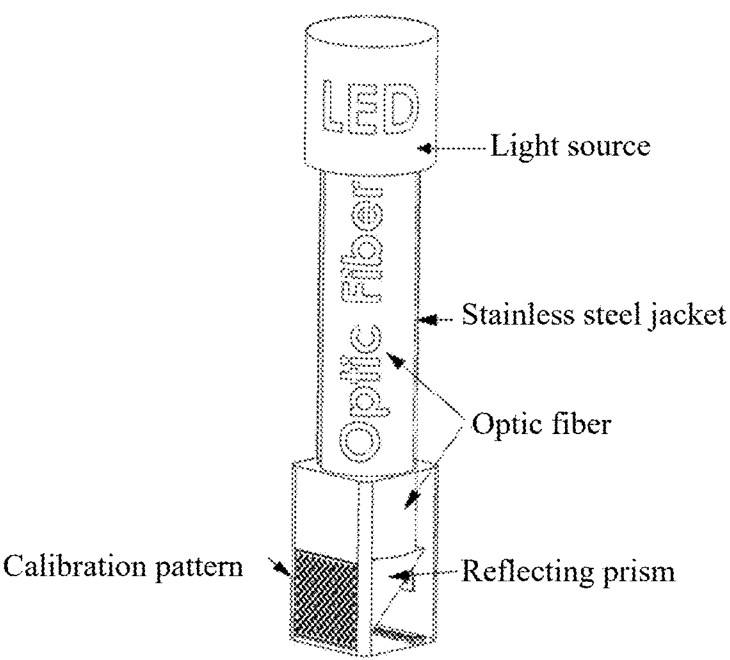
Figure 1C:
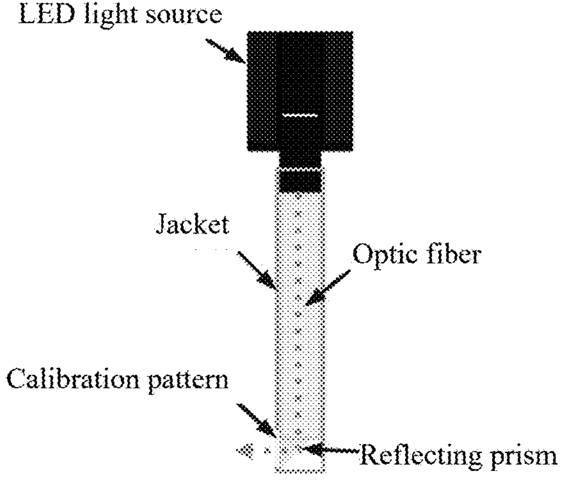

The method is implemented based on a non-contact industrial binocular telecentric imaging system, as shown in FIG. 1(*a*). The example adopts a 1 L glass crystallizer. A 4-blade stirring paddle connected to a computer is arranged inside the reactor, and 500 mL of crystal aqueous solution is injected into the reactor. A non-contact binocular imaging device is configured outside the reactor, and comprises two high-speed and high-resolution industrial-grade monochrome cameras connected to the computer and two LED point light sources to provide back lighting, which are located, together with the cameras, on both sides of the reactor respectively. In the calibration process, the calibration pole is inserted through a device hole at the top end of the reactor into an imaging target region, and the calibration pole is rotated to complete system calibration. The design of the calibration pole is detailed in FIG. 1(*b*), 1(*c*). A light ray emitted by an LED at the top of the calibration pole is guided to a reflecting prism at the bottom of the calibration rod through an optic fiber, and the reflecting prism reflects the light ray vertically to a back surface of a ceramic calibration plate engraved with a checkerboard pattern. Reflected light provides illumination for the shooting of two telecentric cameras to complete the shooting of calibrated image groups. In the measurement process, binocular images (a left view and a right view) of the crystallization process are synchronously collected through two telecentric cameras. After epipolar constraint rectification and matching, crystals of any attitude in the solution are reconstructed to achieve three-dimensional crystal length and width size measurement based on binocular vision.

The method comprises the following specific steps:

Step 1, Calibration:

To eliminate the influence of refraction generated by the propagation of light in a cross-medium optical system to a certain extent, the present invention proposes a new rotational in situ calibration method. The calibration of a stereo telecentric system can be simply completed by manually rotating the calibration plate to perform in situ imaging around the axis. Thus, a backlit calibration rod composed of a light-emitting diode (LED), a ceramic calibration plate covered with a checkerboard pattern, a reflecting prism and an optic fiber is designed for extending into target spaces such as a reactor for in situ calibration.

Figure 2:
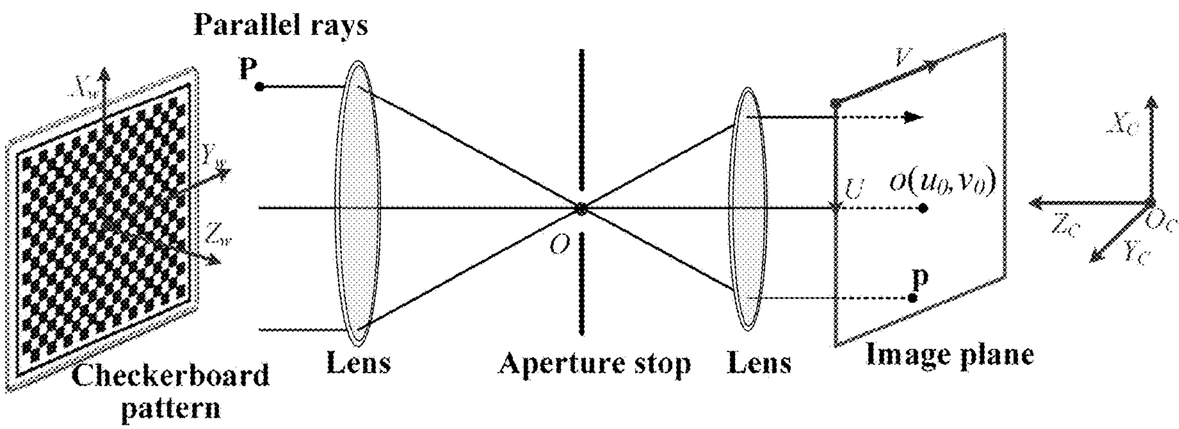
FIG. 2 is a schematic diagram of a telecentric imaging model of the present invention.

(1) Monocular Camera Parameter Calibration:

According to a telecentric camera imaging model shown in FIG. 2, the world coordinates of the planar calibration plate can be associated with captured image coordinates through a homography matrix H, with a relationship as follows:

$$\begin{bmatrix} u \\ v \\ 1 \end{bmatrix} = \begin{bmatrix} mr_{11} & mr_{12} & mt_x \\ mr_{21} & mr_{22} & mt_y \\ 0 & 0 & 1 \end{bmatrix} \begin{bmatrix} x_w \\ y_w \\ 1 \end{bmatrix} = \underbrace{\begin{bmatrix} h_{11} & h_{12} & h_{13} \\ h_{21} & h_{22} & h_{23} \\ 0 & 0 & 1 \end{bmatrix}}_{\text{homography matrix } H} \begin{bmatrix} x_w \\ y_w \\ 1 \end{bmatrix} \quad (22)$$

For the convenience of analysis, Euler angles are introduced to describe the rotation matrix R(α, β, θ), and α, β, and θ are rotation angles around X-axis, Y-axis, and Z-axis of the coordinate system respectively. Corresponding elements of the rotation matrix are described as:

$$\begin{cases} r_{11} = \cos(\beta)\cos(\theta) \\ r_{12} = \cos(\beta)\sin(\theta) \\ r_{21} = \cos(\theta)\sin(\beta)\sin(\alpha) - \cos(\alpha)\sin(\theta) \\ r_{22} = \sin(\theta)\sin(\beta)\sin(\alpha) - \cos(\theta)\cos(\alpha) \end{cases} \quad (23)$$

By making the corresponding elements of a 3×3 matrix in (2) equal, the following equation can be easily established:

$$\begin{cases} m\cos(\beta)\cos(\theta) = h_{11} \\ m\cos(\beta)\sin(\theta) = h_{12} \\ m(\cos(\theta)\sin(\beta)\sin(\alpha) - \cos(\alpha)\sin(\theta)) = h_{21} \\ m(\sin(\theta)\sin(\beta)\sin(\alpha) - \cos(\theta)\cos(\alpha)) = h_{22} \end{cases} \quad (24)$$

where α, β and θ are the rotation angles within the range of (−π/2, π/2). In addition, an effective magnification factor is defined as a positive value. The solution of the above equation is:

$$\begin{cases} m = \sqrt{0.5\left(-b + \sqrt{b^2 - 4c}\right)} \\ \theta = \arctan(h_{12}/h_{11}) \\ \beta = \pm\arccos\left(\sqrt{h_{11}^2 + h_{12}^2}/m\right) \\ \alpha = \arcsin\left(\dfrac{h_{22}h_{12} + h_{21}h_{11}}{m\sin\beta\sqrt{h_{11}^2 + h_{12}^2}}\right) \end{cases} \quad (25)$$

where $$b = -\left(h_{11}^2 + h_{12}^2 + h_{21}^2 + h_{22}^2\right), \text{ and } c = (h_{11}h_{22} - h_{12}h_{21})^2.$$

The translation matrix $T(t_x, t_y)$ is calculated as:

$$\begin{cases} t_x = h_{13}/m \\ t_y = h_{23}/m \end{cases} \quad (26)$$

Therefore, the magnification factor m and the Euler angle θ can be uniquely determined. However, the Euler angles α and β have two possible signs. Therefore, a single-camera coordinate system may have two ambiguous postures related to the world coordinate system, while a binocular camera system may have four ambiguous postures. Recovering the true Euler angles α and β is a key to a calibration method of the system.

Due to the orthographic projection characteristics of the above telecentric cameras, the camera postures recovered from a two-dimensional mode have ambiguity. The existing methods depend on a three-dimensional calibration mode with limited accuracy or make full use of external displacement. However, due to the existence of a reactor wall, a physical relationship cannot be established between an imaging target and a stereo vision system and the existing methods cannot be used for in situ calibration of the stereo vision system. To overcome the above difficulties, a novel calibration method using a rotation pattern is proposed here for practical application.

In the calibration process, a calibration pattern rotates around $Y_w$-axis in a specific angular sequence (clockwise or counterclockwise) to enable the cameras to obtain ordered calibrated shooting images. Therefore, it is observed that the placement angle of the calibration pattern is changed to increase (or decrease) successively. Meanwhile, the rotation angle β of the world coordinate system related to the camera coordinate system also monotonically increases (or decreases). For analysis simplicity, it is assumed that the calibration pattern is rotated clockwise around the $Y_w$-axis.

For each image captured in the correction process, the external matrices of the cameras are changed. By taking a positive sign for the β solution in (25), a set of values for a rotation matrix $R^k$ ($\alpha^k$, $\beta^k$, $\theta^k$), a translation vector $$T^k\left(t_x^k, t_y^k\right),$$

and a magnification factor $m_k$ of the k-th corrected image can be obtained. A calculation formula for the magnification factor m is:

$$m = \frac{1}{N}\sum m^k,\ k = 1, 2, \ldots N \tag{27}$$

Considering that a real rotation angle β is a monotonically increasing sequence, the absolute value of β may present a local minimum point or maintain a monotonic trend. Calculation of the absolute value of angle sequence can check whether there is the local minimum point. If there are multiple local minimum points or local maximum points, the calibration conditions are not met. However, if prescribed conditions are met, it can be inferred that the extreme points occur near a minimum value of a discrete sequence, resulting in $$k^e = \arg\min_k \left|\beta^k\right|,\ k = 1, 2, \ldots, N \tag{28}$$

Figure 5A:
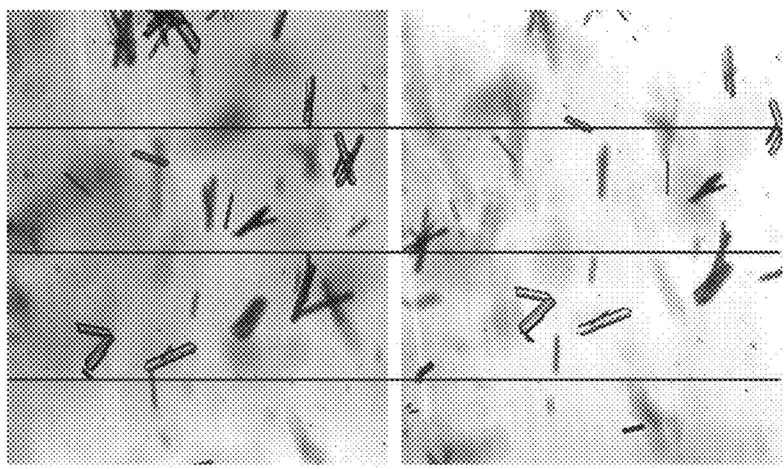
FIGS. 5(*a*)-5(*b*) are schematic diagrams of epipolar rectification, FIG. 5(*a*) shows original collected crystal images, and FIG. 5(*b*) shows rectified crystal images.
Figure 5B:
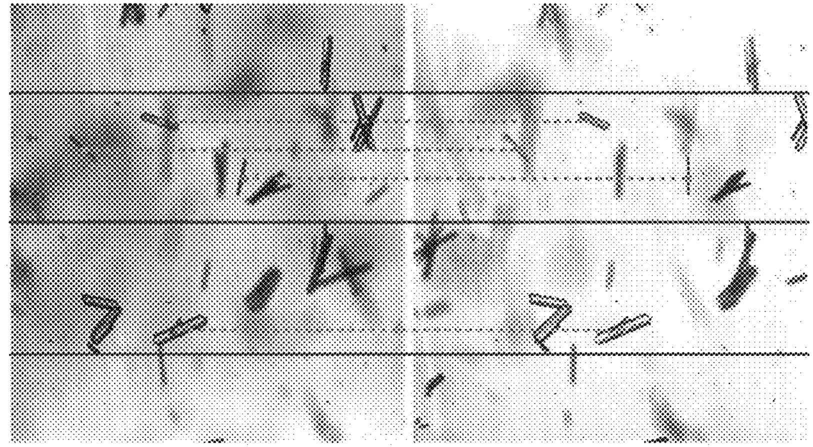

Through a number of discrete $\beta^k$, the extremum point could be determined in the vicinity of the minimum value, such as the left- or right-side of the minimum value, as shown in FIG. 5(*a*). Because the rotation angle β is monotonically increasing, except a sign of the minimum point, the sign is restored by the following equation:

$$\hat{\beta}^k = \begin{cases} -\left|\beta^k\right|, & k < k^e \\ \left|\beta^k\right|, & k > k^e \end{cases},\ k = 1, 2, \ldots, k^e - 1, k^e + 1, \ldots, N \tag{29}$$

The rotation angle α is restored by the following formula:

$$\hat{\alpha}^k = \frac{\hat{\beta}^k}{\beta^k}\alpha^k,\ k = 1, 2, \ldots, k^e - 1, k^e + 1, \ldots, N \tag{30}$$

Figure 3:
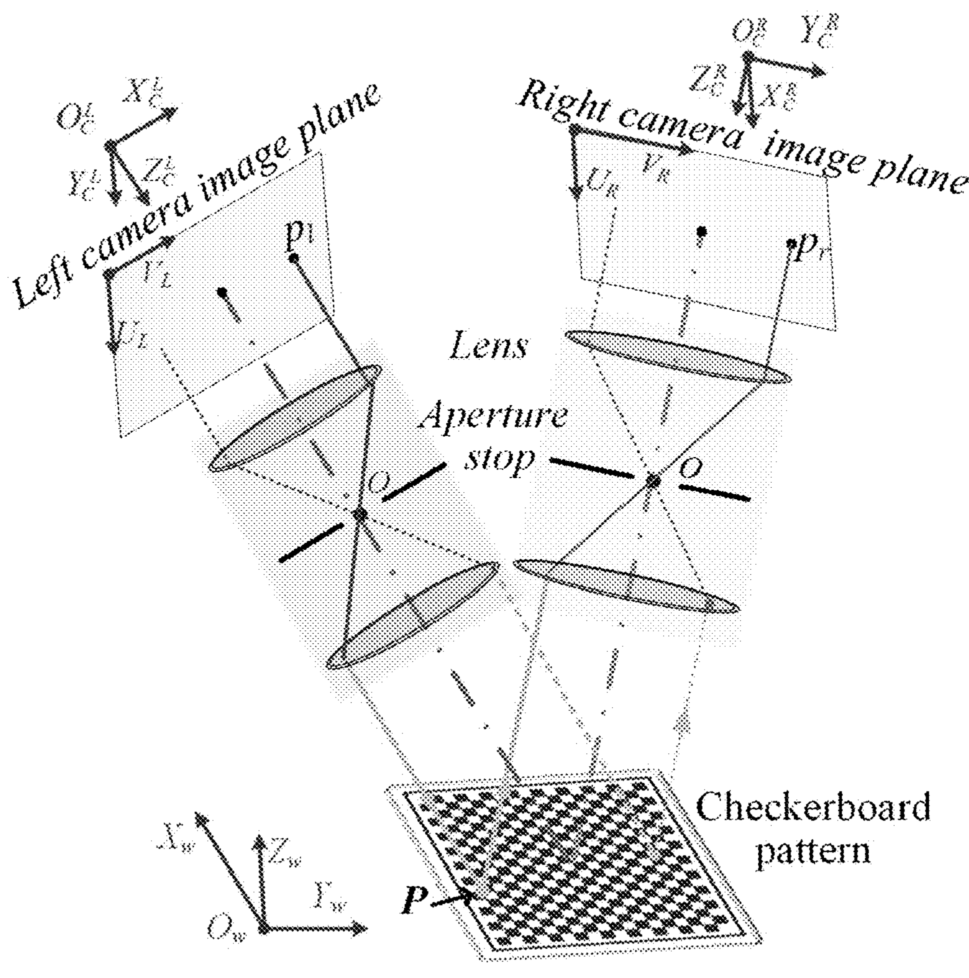
FIG. 3 is a schematic diagram of a binocular telecentric stereo imaging model of the present invention.

(2) Parameter Calibration of Stereo Vision System:

The essence of binocular vision calibration is to obtain a relative positional relationship between two telecentric cameras, as shown in FIG. 3. The coordinate positional relationship of left and right cameras is described by the rotation matrix $R_C$ and a translation vector $T_C$, that is:

$$\begin{bmatrix} x_c^R \\ y_c^R \\ z_c^R \end{bmatrix} = R_R(R_L)^{-1}\begin{bmatrix} x_c^L \\ y_c^L \\ z_c^L \end{bmatrix} + T_R - R_C T_L = R_C\begin{bmatrix} x_c^L \\ y_c^L \\ z_c^L \end{bmatrix} + T_C \tag{31}$$

where $R_L$ and $T_L$, and $R_R$ and $T_R$ are rotation matrices and transfer vectors related to the world coordinate system and left and right camera coordinate systems respectively.

For each pair of calibrated images, the external matrices of the left and the right cameras undergo changes, while the relative rotation matrix $R_C$ between the left and the right cameras remains invariant. The Euler angle of $R_C$ obtained from the k-th pair of calibrated images is expressed as:

$$\begin{aligned} R_C^k\left(\alpha_C^k, \beta_C^k, \theta_C^k\right) &= R_R^k\left(\hat{\alpha}_R^k, \hat{\beta}_R^k, \theta_R^k\right)R_L^k\left(\hat{\alpha}_L^k, \hat{\beta}_L^k, \theta_L^k\right)^{-1} \\ &= R_C^k\left(\hat{\alpha}_R^k - \hat{\alpha}_L^k, \hat{\beta}_R^k - \hat{\beta}_L^k, \theta_R^k - \theta_L^k\right) \end{aligned} \tag{32}$$

where $\alpha_C$, $\beta_C$ and $\theta_C$ are rotation angles around X-axis, Y-axis and Z-axis of the left camera coordinate system. The rotation Euler angles $\hat{\alpha}_L$, $\hat{\beta}_L$, $\theta_L$ and $\hat{\alpha}_R$, $\hat{\beta}_R$, $\theta_R$ represent external parameters $R_L$ and $R_R$ in the left and right camera coordinate systems. The superscript k represents that the data comes from the kth group of calibrated images.

The Euler angles $\alpha_C$, $\beta_C$ and $\theta_C$ obtained from N pairs of different calibrated images are optimized:

$$\begin{aligned} \alpha_C &= \frac{1}{N}\sum \hat{\alpha}_R^k - \hat{\alpha}_L^k,\ k \in \{1, 2, \ldots\ -N\} - \{k_L^e, k_R^e\} \\ \beta_C &= \frac{1^k}{N_k}\sum \hat{\beta}_R^k - \hat{\beta}_L^k,\ k \in \{1, 2, \ldots\ N\} - \{k_L^e, k_R^e\} \\ \theta_C &= \frac{1}{N}\sum \theta_R^k - \theta_L^k,\ k = 1, 2, \ldots N \end{aligned} \tag{33}$$

where $N_k$ represents the number of variables in a calibrated image set.

The representation form of the calculated Euler angle of the rotation matrix is converted into a matrix representation form $R_C$, and $T_C$ is calculated according to (11) to complete stereo calibration work.

Figure 4:
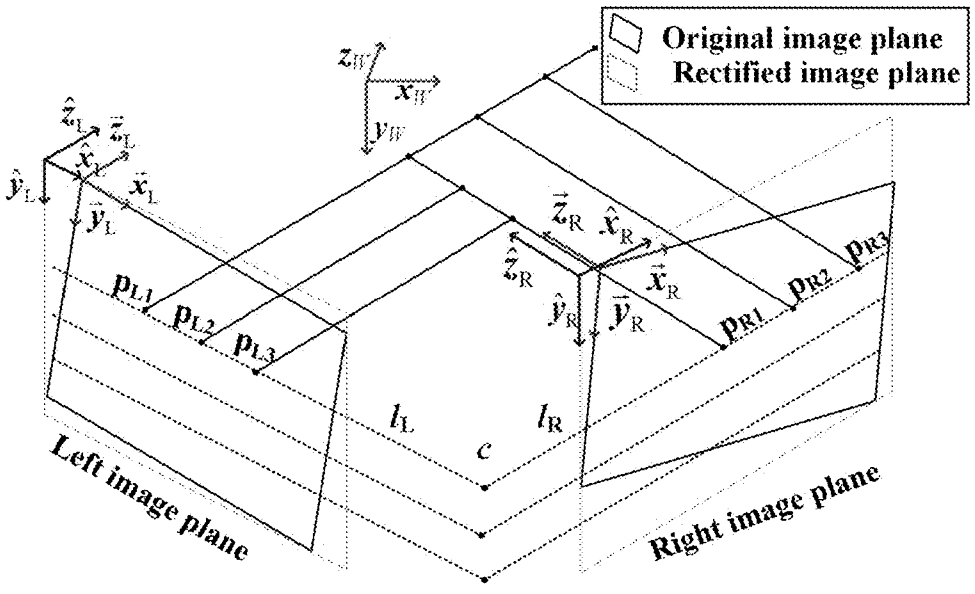
FIG. 4 is a schematic diagram of an epipolar rectification model of the present invention.

Step 2, Rectification:

To reduce the calculation complexity of the matching process, the present invention proposes a simplified telecentric stereo vision epipolar rectification method. The method associates the images before and after rectification through a 3×3 homography matrix to complete a reprojection rectification process. As shown in FIG. 4, the coordinate systems of the rectified left and right camera pixels are aligned along the common y-axis.

The projections of point P from the world coordinate system to left and right camera pixel coordinate systems are represented respectively as $$\begin{aligned} \begin{bmatrix} p_L \\ 1 \end{bmatrix} &= \mathrm{diag}\,(m_L \quad m_L \quad 1)\begin{bmatrix} R_{L2\times2} & T_{L2\times1} \\ 0_{1\times2} & 1 \end{bmatrix}\begin{bmatrix} P_{2\times1} \\ 1 \end{bmatrix} = H_L\begin{bmatrix} P_{2\times1} \\ 1 \end{bmatrix} \\ \begin{bmatrix} p_R \\ 1 \end{bmatrix} &= \mathrm{diag}\,(m_R \quad m_R \quad 1)\begin{bmatrix} R_{R2\times2} & T_{R2\times1} \\ 0_{1\times2} & 1 \end{bmatrix}\begin{bmatrix} P_{2\times1} \\ 1 \end{bmatrix} = H_R\begin{bmatrix} P_{2\times1} \\ 1 \end{bmatrix} \end{aligned} \tag{34}$$

Considering that the magnification factors of the two left and right cameras after rectification should be equal to ensure the y-axes of the two cameras are aligned in the pixel coordinate system, a maximum magnification factor is found therefrom to determine the magnification factors of the two cameras:

$$\hat{m} = \max(m_L, m_R) \tag{35}$$

Therefore, the projections of point P from the world coordinate system to rectified left and right camera pixel coordinate systems are determined respectively as:

$$\begin{bmatrix} \hat{p}_L \\ 1 \end{bmatrix} = \mathrm{diag}\left( \hat{m} \;\; \hat{m} \;\; 1 \right) \begin{bmatrix} \hat{R}_{L2\times2} & \hat{T}_{L2\times1} \\ 0_{1\times2} & 1 \end{bmatrix} \begin{bmatrix} P_{2\times1} \\ 1 \end{bmatrix} = \hat{H}_L \begin{bmatrix} P_{2\times1} \\ 1 \end{bmatrix} \tag{36}$$

$$\begin{bmatrix} \hat{p}_R \\ 1 \end{bmatrix} = \mathrm{diag}\left( \hat{m} \;\; \hat{m} \;\; 1 \right) \begin{bmatrix} \hat{R}_{L2\times2} & \hat{T}_{L2\times1} \\ 0_{1\times2} & 1 \end{bmatrix} \begin{bmatrix} P_{2\times1} \\ 1 \end{bmatrix} = \hat{H}_R \begin{bmatrix} P_{2\times1} \\ 1 \end{bmatrix}$$

As shown in FIG. 4, $\vec{x}_L$, $\vec{y}_L$, $\vec{z}_L$, $\hat{x}_L$, $\hat{y}_L$, $\hat{z}_L$, $\vec{x}_R$, $\vec{y}_R$, $\vec{z}_R$, $\hat{x}_R$, $\hat{y}_R$ and $\hat{z}_R$ represent the direction vectors of the X-axis, Y-axis and Z-axis in the left and right camera coordinate systems of the cameras before and after rectification respectively, i.e., the row vectors of $R_L$, $R_R$, $\hat{R}_L$ and $\hat{R}_L$. It should be noted that after rectification, the y-axis of the left camera coordinate system is parallel to the y-axis of the right camera, and the z-axis representing the direction of the light ray remains unchanged. Therefore, the common y-axis is perpendicular to the optic axes of the left and right cameras. The direction vectors of the ideal rectified coordinate systems for the left and right cameras can be expressed as:

$$\hat{z}_L = \vec{z}_L,\ \hat{z}_R = \vec{z}_R \tag{37}$$

$$\hat{y}_L = \hat{y}_R = norm(\hat{z}_L \times \hat{z}_R)$$

$$\hat{x}_L = \hat{z}_L \times \hat{y}_L,\ \hat{x}_R = \hat{z}_R \times \hat{y}_R$$

To align the y-axes of the rectified left and right camera coordinate systems, a new translation vector is calculated as $$[\,\tau_{Lx} \;\; \tau_{Ly} \;\; \tau_{Lz}\,]^T = \hat{R}_L R_L^{-1} [\,T_{L2\times1} \;\; 0\,]^T \tag{38}$$

$$[\,\tau_{Rx} \;\; \tau_{Ry} \;\; \tau_{Rz}\,]^T = \hat{R}_R R_R^{-1} [\,T_{L2\times1} \;\; 0\,]^T$$

$$\hat{T}_L = [\tau_b \;\; (\tau_{Ly} + \tau_{Ry})/2] \tag{39}$$

$$\hat{T}_R = [\tau_{Rx} \;\; (\tau_{Ly} + \tau_{Ry})/2]$$

In combination with formula (34) and formula (36), conversion from original image coordinates to rectified coordinates is established:

$$\begin{bmatrix} \hat{p}_L \\ 1 \end{bmatrix} = \hat{H}_L H_L^{-1} \begin{bmatrix} p_L \\ 1 \end{bmatrix} = H_L^S \begin{bmatrix} p_L \\ 1 \end{bmatrix} \tag{40}$$

$$\begin{bmatrix} \hat{p}_R \\ 1 \end{bmatrix} = \hat{H}_R H_R^{-1} \begin{bmatrix} p_R \\ 1 \end{bmatrix} = H_R^s \begin{bmatrix} p_R \\ 1 \end{bmatrix}$$

Step 3, Matching, Reconstruction and Measurement:

(1) Matching

The collected original images are shown in FIG. 5(*a*). Firstly, the images are rectified through a rectification method in Step 2, and crystal images are quickly matched through one-dimensional search. The rectified image and the matched crystal are shown in FIG. 5(*b*). Then, a length feature point pair is obtained by a distance from a contour to a center point of the contour, and the length feature point pair is connected to obtain the principal axis of crystal, as shown by the dotted lines connected by star marks in FIG. 6(*b*).

Figure 6A:
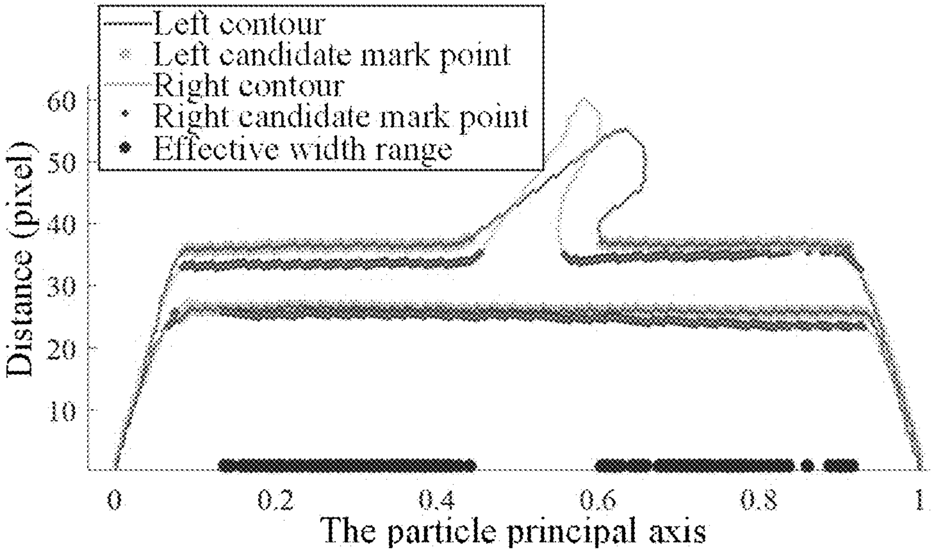
FIGS. 6(*a*)-6(*b*) are schematic diagrams of acquisition of width feature points of a rod-like crystal projection of the present invention, wherein FIG. 6(*a*) is a schematic diagram of the projection of a crystal contour on the crystal principal axis and the selection of the width feature points, and FIG. 6(*b*) is a schematic diagram of extracted crystal length feature matching points and width feature matching points.
Figure 6B:
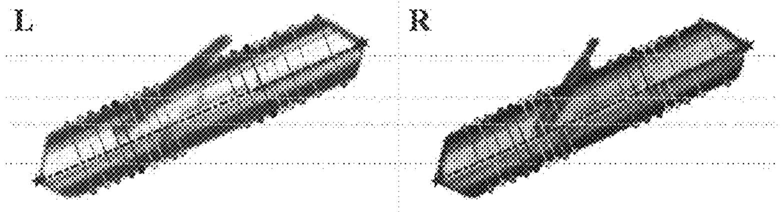

It should be pointed out that in the crystallization process, small crystals adhere to the edges of large crystals, as shown in FIG. 6(*b*). To avoid accidental extraction during measurement of the crystal width, the present invention proposes a method for selecting effective width contour points for measurement as follows:

The measurement of the width of each particle refers to the calculation of a Euclidean distance between two contour points, and a connecting line between the contour points is perpendicular to the principal axis of a measured particle. To ensure the measurement accuracy, all contour point pairs perpendicular to the principal axis connecting line are selected as candidate mark points for measuring the particle width. Thus, the particle contour is divided into an upper half and a lower half according to the principal axis. A distance from the contour points on each half contour to the principal axis is calculated as $$d_{Line}^i = \frac{\left|(p_u - p_d) \times (p_d - C^i)\right|}{|p_u - p_d|} \tag{41}$$

Considering that the particle width distance should reflect the dominant distances of the above pairs of contour points rather than their averaged distance, it is suggested to judge whether the deviation of such a distance is smaller than a half of the mean absolute deviation, defined, respectively, by $$d_e^i = \left| d_{Line}^i - \text{median } (d_{Line}) \right| \tag{42}$$

$$\delta_{MAD} = \frac{1}{N_p} \sum_i^{N_p} \left| d_{Line}^i - \text{median } (d_{Line}) \right| \tag{43}$$

where $N_P$ represents the number of the points on each half contour. If yes, the corresponding point is identified as a candidate, and vice versa, as shown by the candidate points of the left and right contours in FIG. 6(*a*).

To match these candidate points, the contour coordinates in the left and right images are projected onto their principal axes, respectively through the following formula. The distances from the normalized contours to the principal axes are shown in FIG. 6(*a*).

$$P^i = \frac{\left|C^i \square (p_u - p_d)\right|}{|p_u - p_d|^2} (x_u - x_d) \tag{44}$$

where $x_u$ and $x_d$ are the x-coordinate values of $p_u$ and $p_d$ respectively.

The candidate points along the upper and lower half contours in the left image, which share the same projected coordinates, are considered as a pair of the particle width mark points, as shown by dot marks on the transverse coordinate axis in FIG. 6(*a*). Similarly, the corresponding matching points in the right image also have the same projected coordinates. That is, four candidate points with the same projected coordinates on the upper half contour and the lower half contour of the two left and right images constitute a group of particle width mark points.

(2) Reconstruction

Figure 7:
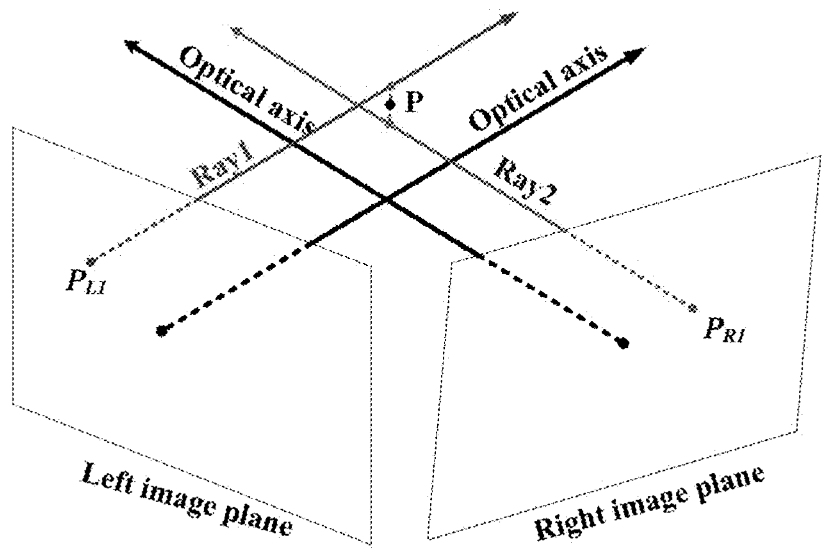
FIG. 7 is a schematic diagram of a reconstruction model by light ray intersection in the present invention.

For a telecentric stereo vision system, the present invention proposes a new telecentric stereo vision three-dimensional reconstruction method by light ray intersection based on analytical solutions, as shown in FIG. 7, as follows:

Firstly, constructing the position equations of each ray of $$(x_L^c, y_L^c, z_L^c) \text{ and } (x_R^c, y_R^c, z_R^c)$$

through matching points on left and right physical image planes respectively.

$$\frac{(x_l - x_L^c)}{d_L^x} = \frac{(y_l - y_L^c)}{d_L^y} = \frac{(z_l - z_L^c)}{d_L^z} = \tau_L \tag{45}$$

$$\frac{(x_r - x_R^c)}{d_R^x} = \frac{(y_r - y_R^c)}{d_R^y} = \frac{(z_r - z_R^c)}{d_R^z} = \tau_R \tag{46}$$

where $(x_l, y_l, z_l)$ represents the coordinate of any point on a left image plane light ray;

$$(x_L^c, y_L^c, z_L^c)$$

represents the coordinate of the matching point on the left physical image plane;

$$(d_L^x, d_L^y, d_L^z)$$

represents the unit vector of the direction of a left camera optic axis; $\tau_L$ is a light ray coefficient of a left camera; $(x_r, y_r, z_r)$ represents the coordinate of any point on a right image plane light ray;

$$(x_R^c, y_R^c, z_R^c)$$

represents the coordinate of the matching point on the right physical image plane;

$$(d_R^x, d_R^y, d_R^z)$$

represents the unit vector of the direction of a right camera optic axis; and $\tau_R$ is a light ray coefficient of a right camera. If the computed points on the physical image plane and the location equations of the above rays are precise, there is only one intersection point between the left and right rays for each sampled point on the object surface. However, due to the existence of noise, the left and right light rays may not intersect. To find an optimal intersection point, two points closest to the left ray and the right ray are calculated respectively.

The distance between any two points on the left and right light rays is expressed as:

$$d = \sqrt{(x_l - x_r)^2 + (y_l - y_r)^2 + (z_l - z_r)^2} \tag{47}$$

(45) and (46) are substituted into (47) to obtain quadratic equations regarding $\tau_L$ and $\tau_R$:

$$f(\tau_L, \tau_R) = d^2(\tau_L, \tau_R) = (\tau_L d_L^x + x_L^c - \tau_R d_R^x - x_R^c)^2 + (\tau_L d_L^y + y_L^c - \tau_R d_R^y - y_R^c)^2 + (\tau_L d_L^z + z_L^c - \tau_R d_R^z - z_R^c)^2 \tag{48}$$

By setting $$\frac{\partial f}{\partial \tau_L} = 0 \text{ and } \frac{\partial f}{\partial \tau_R} = 0,$$

the minimum value of $f(\tau_L, \tau_R)$ is calculated, and the values of $\tau_L$ and $\tau_R$ are determined as:

$$\begin{cases} \tau_L = \dfrac{AD + BE}{CD - BF} \\ \tau_R = \dfrac{CE + FA}{CD - BF} \end{cases} \tag{49}$$

where $$\begin{aligned} A &= x_R^c d_L^x + y_R^c d_L^y + z_R^c d_L^z - x_L^c d_L^x - y_L^c d_L^y - Z_L^c d_L^z \\ B &= d_R^x d_L^x + d_R^y d_L^y + d_R^z d_L^z \\ C &= d_L^{x2} + d_L^{y2} + d_L^{z2} \\ D &= d_R^{x2} + d_R^{y2} + d_R^{z2} \\ E &= x_L^c d_R^x + y_L^c d_R^y + Z_L^c d_R^z - x_R^c d_R^x - y_R^c d_R^y - z_R^c d_R^z \\ F &= d_R^x d_L^x + d_R^y d_L^y + d_R^z d_L^z \end{aligned} \tag{50}$$

correspondingly, calculating the coordinate of the reconfiguration point by the following formula:

$$\begin{bmatrix} x_w \\ y_w \\ z_w \end{bmatrix} = \frac{1}{2}\left(\begin{bmatrix} x_L^c \\ y_L^c \\ z_L^c \end{bmatrix} + \tau_L \begin{bmatrix} d_L^x \\ d_L^y \\ d_L^z \end{bmatrix}\right) + \frac{1}{2}\left(\begin{bmatrix} x_R^c \\ y_R^c \\ z_R^c \end{bmatrix} + \tau_R \begin{bmatrix} d_R^x \\ d_R^y \\ d_R^z \end{bmatrix}\right) \tag{51}$$

(3) Measurement

Figure 8A:
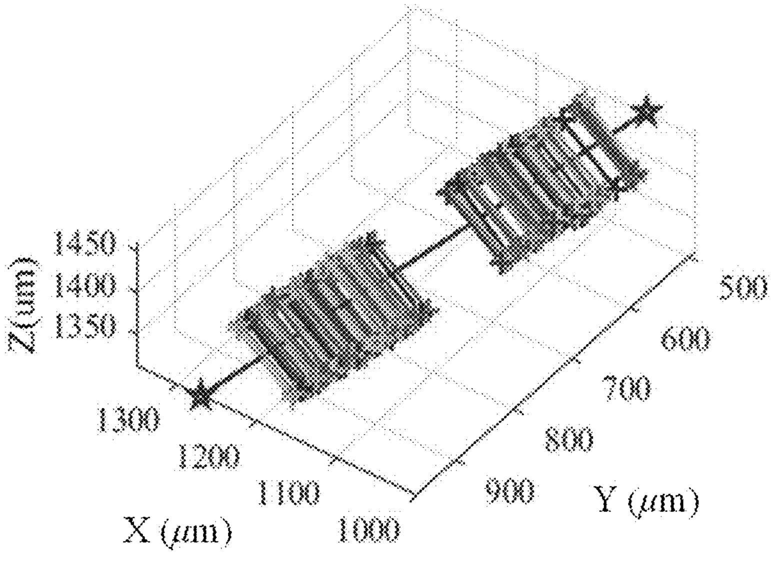
FIGS. 8(*a*)-8(*b*) are schematic diagrams of calculation of crystal length and width sizes of the present invention, FIG. 8(*a*) shows crystal length and width feature points from three-dimensional reconstruction, and FIG. 8(*b*) shows the measurement results of crystal width.
Figure 8B:
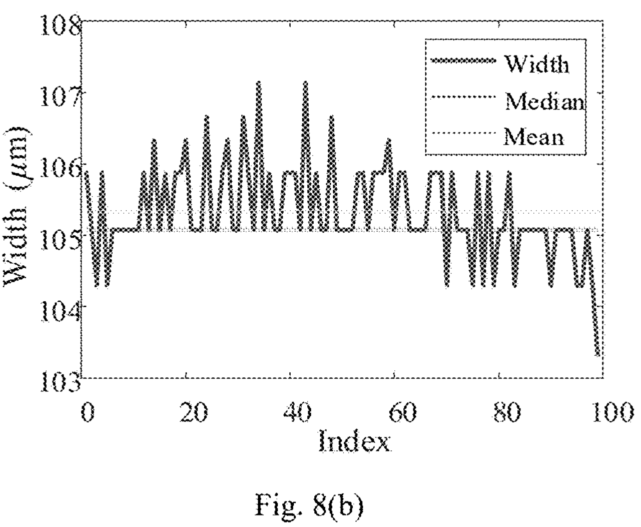

Firstly, the three-dimensional spatial coordinates of the feature points are calculated for the matched feature point pairs by using the above three-dimensional reconstruction method. The reconstructed feature points are shown in FIG. 8(*a*). Then, a Euclidean distance between the length feature points is taken as a crystal length. Euclidean distances among a plurality of width feature points are voted, and the distance of the width feature point with a highest occurrence frequency is selected as a crystal width, i.e., a width median, as shown in FIG. 8(*b*), to complete the measurement of the length and width sizes of the crystals.

The three-dimensional coordinates of length mark points $P_u$ and $P_d$ and width mark point sets $P_f$ and $P_l$ are calculated by using the above three-dimensional reconstruction method. Therefore, the length and the width of each crystal can be calculated as:

$$L = |P_u - P_d| \tag{52}$$

-continued $$W_{med} = \text{median}(|P_f - P_i|) \quad (53)$$

$$W_{mean} = \text{mean}(|P_f - P_i|) \quad (54)$$

Figure 9A:
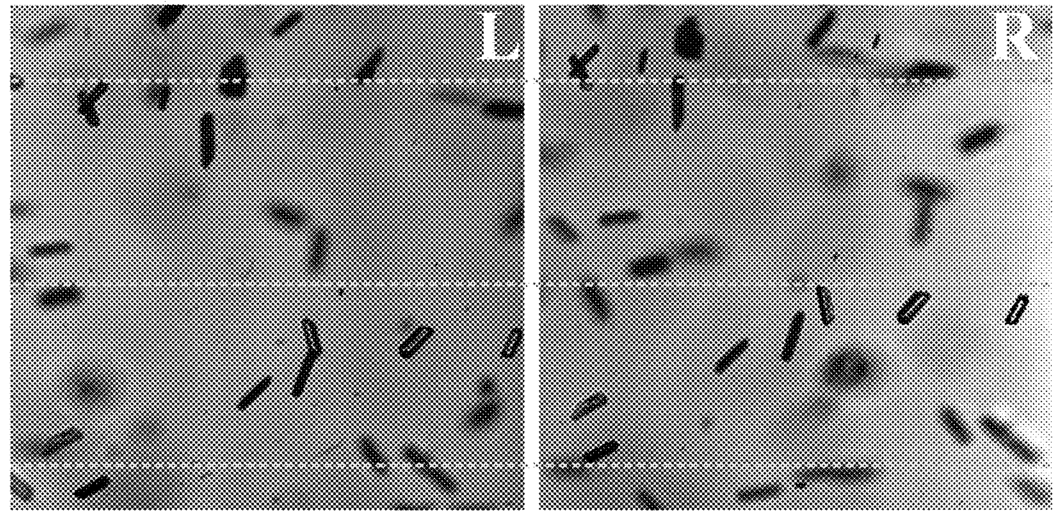
FIGS. 9(*a*)-9(*b*) are schematic diagrams of epipolar rectification, FIG. 9(*a*) shows original collected crystal image, and FIG. 9(*b*) shows rectified crystal images and crystal detection results.
Figure 9B:
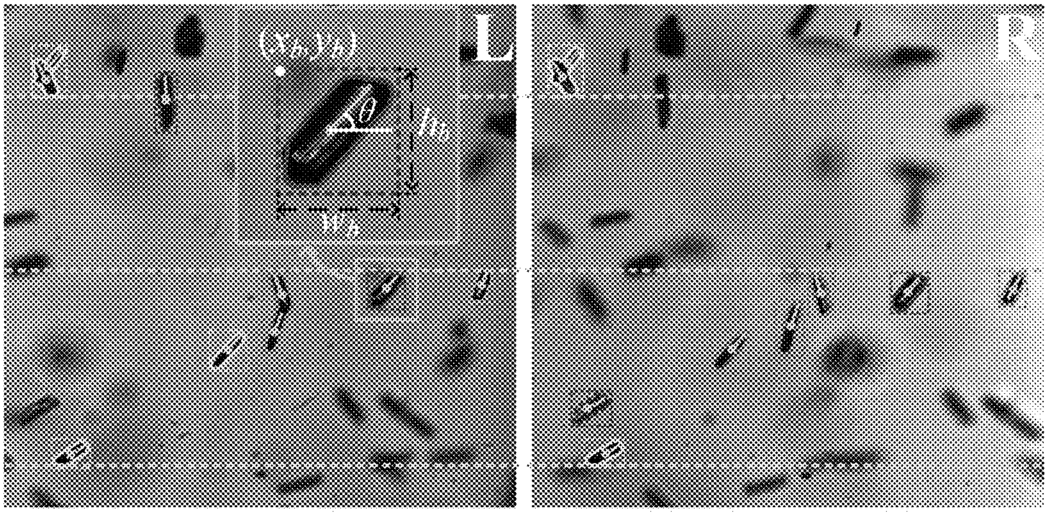
Figure 10:
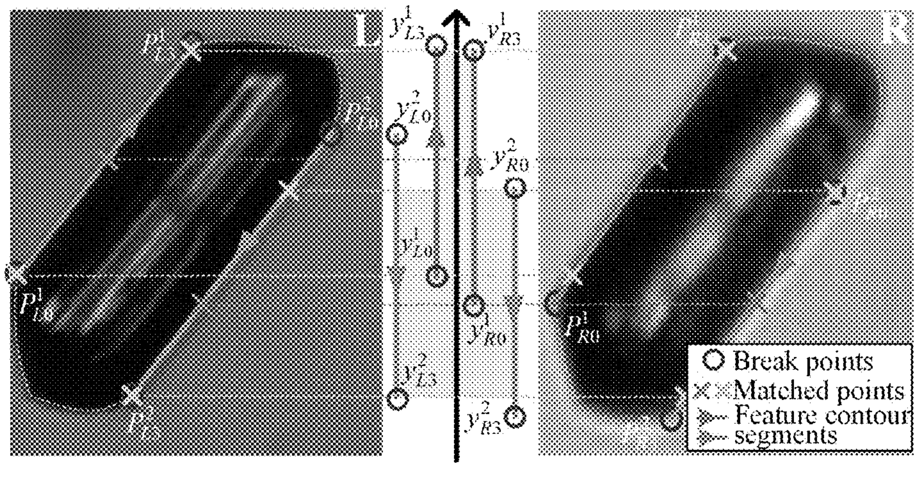
FIG. 10 is a schematic diagram of feature contour segments and corresponding feature point pairs for crystal matching of the present invention.

Step 3 can also be achieved through the following matching, reconstruction and measurement methods:

(1) Matching:

The collected original images are shown in FIG. 9(*a*). Firstly, the images are rectified through the rectification method in Step 2: subsequently, a deep learning algorithm (YOLOv8) is used for crystal segmentation and oriented bounding boxes object detection, and the crystal images are quickly matched through one-dimensional search. The rectified image and the matched crystal are shown in FIG. 9(*b*). Then, a part with linear features on the crystal contour is obtained by piecewise fitting using Bezier curves: subsequently, y coordinate and the angle directions of line segments are matched, as shown by directed line segments in FIG. 10; and the line segments are simplified into feature points with weights, as shown by intersection points in FIG. 10.

(2) Reconstruction:

The above telecentric stereo vision three-dimensional reconstruction method by light ray intersection based on analytical solutions is for reference.

Figure 11:
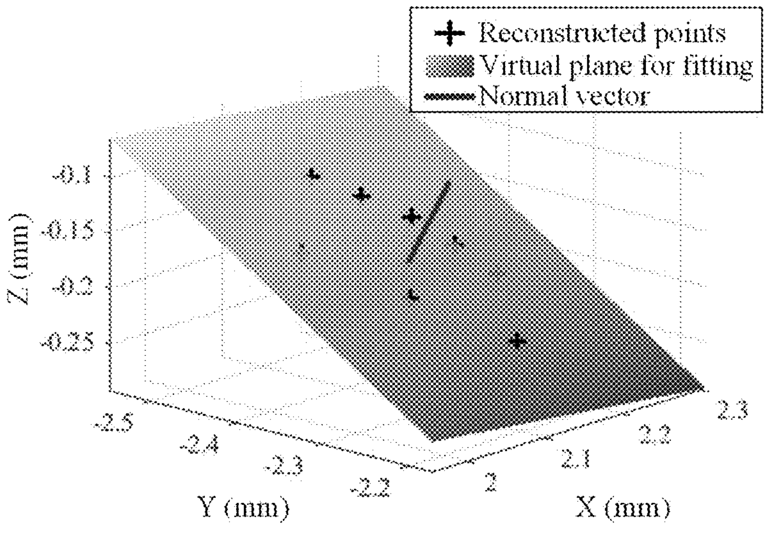
FIG. 11 is a schematic diagram of three-dimensional reconstruction of matching points and fitting of a virtual imaging plane in the present invention.

(3) Establishment of Virtual Imaging Planes:

To transform at the three-dimensional spatial postures of the crystal images into virtual two-dimensional images to facilitate analysis, the present invention proposes a virtual stereo imaging method based on homography projection transformation. Inspired by offline microscope imaging scenarios, the virtual camera can capture the vertical projection of a maximum crystal surface. A maximum projection surface is reconstructed to accurately measure the length, the width and the area of the captured crystal. In addition, a self-supervision verification strategy based on virtual imaging consistency between left and right camera images is proposed to ensure the accuracy of three-dimensional reconstruction of crystal images. Specifically:

The crystal feature contour points matched in (1) are reconstructed by using the method in (2), and the three-dimensional coordinates of a starting point, an ending point and a midpoint of the matched crystal feature contour can be obtained, as shown by black intersection point marks in FIG. 11.

Based on the above representative 3-D points, a virtual imaging plane is constructed for fitting. According to the three-dimensional length of the feature contour represented by the feature points, the weights of the feature points are defined as $$w_i^S = w_i^M = w_i^E = \left\| p_i^E - p_i^S \right\| \quad (2\text{-}17)$$

where $$w^S, w^M \text{ and } w^E$$

represent weights assigned to a starting point, a midpoint and an ending point of an i-th feature contour respectively; and $$p_i^S \text{ and } p_i^E$$

represent a starting point and an ending point of an i-th feature contour.

The equation of a virtual three-dimensional imaging plane is $$a_P x + b_P y + c_P z + d_P = 0 \quad (2\text{-}18)$$

where (x, y, z) are points on a fitting plane; and $a_p$, $b_p$, $c_p$ and $d_p$ are the coefficients of the equation.

After weight allocation, plane fitting is converted into a least square fitting problem which can determine the coefficients $a_p$, $b_p$, $c_p$ and $d_p$ by minimizing the following equation.

$$F(a_P, b_P, c_P, d_P) = \sum_{i=1}^{n} w_i (a_P x_i + b_P y_i + c_P z_i + d_P)^2 \quad (2\text{-}19)$$

where $(x_i, y_i, z_i)$ is the coordinate of an i-th three-dimensional plane point, $w_i$ is the weight of the three-dimensional plane point, and n is the number of the points.

The partial derivatives of F for $a_p$, $b_p$, $c_p$ and $d_p$ are taken and set to be equal to 0, to obtain $$\begin{bmatrix} \sum_{i=1}^{n} w_i x_i^2 & \sum_{i=1}^{n} w_i x_i y_i & \sum_{i=1}^{n} w_i x_i z_i & \sum_{i=1}^{n} w_i x_i \\ \sum_{i=1}^{n} w_i x_i y_i & \sum_{i=1}^{n} w_i y_i^2 & \sum_{i=1}^{n} w_i y_i z_i & \sum_{i=1}^{n} w_i y_i \\ \sum_{i=1}^{n} w_i x_i z_i & \sum_{i=1}^{n} w_i y_i z_i & \sum_{i=1}^{n} w_i z_i^2 & \sum_{i=1}^{n} w_i z_i \\ \sum_{i=1}^{n} w_i x_i & \sum_{i=1}^{n} w_i y_i & \sum_{i=1}^{n} w_i z_i & \sum_{i=1}^{n} w_i \end{bmatrix} \begin{bmatrix} a_p \\ b_p \\ c_p \\ d_p \end{bmatrix} = \begin{bmatrix} \sum_{i=1}^{n} w_i x_i^2 \\ \sum_{i=1}^{n} w_i x_i y_i \\ \sum_{i=1}^{n} w_i x_i z_i \\ \sum_{i=1}^{n} w_i x_i \end{bmatrix} \quad (2\text{-}20)$$

The pseudo-inverse of the above coefficient matrix is obtained through singular value decomposition (SVD), thereby determining the coefficients $a_p$, $b_p$, $c_p$ and $d_p$ of a best-fitting plane. Normalization calculation is conducted for the above four coefficients by using the following formula to obtain the normal vector of the fitting plane as shown in FIG. 11.

$$\vec{n}_v = \left( \frac{a_P}{\sqrt{a_P^2 + b_P^2 + c_P^2}}, \frac{b_P}{\sqrt{a_P^2 + b_P^2 + c_P^2}}, \frac{c_P}{\sqrt{a_P^2 + b_P^2 + c_P^2}} \right) \quad (2\text{-}21)$$

(4) Virtual Camera Projection Imaging:

The projection of a two-dimensional image from a camera imaging plane to a virtual imaging plane is a process of rotation and translation transformation of the imaging planes in a space. Transformation between the camera and the virtual imaging plane is expressed as $$p_v = R_v p_c + t_v = \begin{bmatrix} r_{11}^v & r_{12}^v & r_{13}^v \\ r_{21}^v & r_{22}^v & r_{23}^v \\ r_{31}^v & r_{32}^v & r_{33}^v \end{bmatrix} \begin{bmatrix} x_c \\ y_c \\ z_c \end{bmatrix} + \begin{bmatrix} t_x^v \\ t_y^v \\ t_z^v \end{bmatrix} \quad (2\text{-}22)$$

where $p_v$ and $p_c$ are the coordinates of a three-dimensional point in the camera plane and the virtual plane in the space respectively.

The normal vector $\tilde{n}_v$ of the virtual plane is determined by formula (2-21). Through the system calibration in Step 1, the normal vector $\tilde{n}_c$ of the imaging plane of the binocular camera can be obtained. The rotation matrix between the two planes is calculated through the following formula.

$$\theta = \cos^{-1}\left(\frac{\vec{n}_v \cdot \vec{n}_c}{\|\vec{n}_v\|\|\vec{n}_c\|}\right) \quad (2\text{-}23)$$

$$R_v = \exp([\vec{r}]_x \theta) = I + [\vec{r}]_x \sin\theta + [\vec{r}]_x^2(1 - \cos\theta) \quad (2\text{-}24)$$

The position of a first matching point in the image of the camera plane is designated as the center of the virtual imaging plane, denoted as p1, and the translation vector $t_v$ is $$t_v = \frac{(\vec{n}_v \cdot p_1)}{\|\vec{n}_v\|}\vec{n}_v \quad (2\text{-}25)$$

To eliminate perspective distortion and maintain the geometry and the position of each snapshot crystal, the present invention adopts orthogonal projection transformation. Considering $p_c$ as a point on the imaging plane and $Z_C=0$, the transformation from the camera imaging plane to the virtual imaging plane is constructed by eliminating Z coordinates on both sides of (2-22)

$$\begin{bmatrix} x_v \\ y_v \\ 1 \end{bmatrix} = \lambda \begin{bmatrix} r_{11}^v & r_{12}^v & t_x^v \\ r_{21}^v & r_{22}^v & t_y^v \\ 0 & 0 & 1 \end{bmatrix} \begin{bmatrix} x_c \\ y_c \\ 1 \end{bmatrix} = \lambda H_v \begin{bmatrix} x_c \\ y_c \\ 1 \end{bmatrix} \quad (2\text{-}26)$$

where $H_v$ is a homography matrix, and $\lambda$ is a scaling factor which can be set to 1 because a projection scale is unchanged;

$$r_{11}^v, r_{12}^v, r_{21}^v \text{ and } r_{22}^v$$

are four elements of $R_v$;

$$t_x^v \text{ and } t_y^v$$

are elements of a translation vector $t_v$. Because internal parameters of the virtual camera are the same as those of a real camera, the projection transformation from the camera plane to the virtual plane can be represented by the homography matrix $H_v$ $$\tilde{x}_c = H_v x_c \quad (2\text{-}27)$$

where $\tilde{x}_c=[\tilde{u}_c, \tilde{v}_c, 1]^T$ and $x_c=[u_c, v_c, 1]^T$ represent homogeneous pixel coordinates of the points on the virtual plane and the camera plane respectively.

Figure 12A:
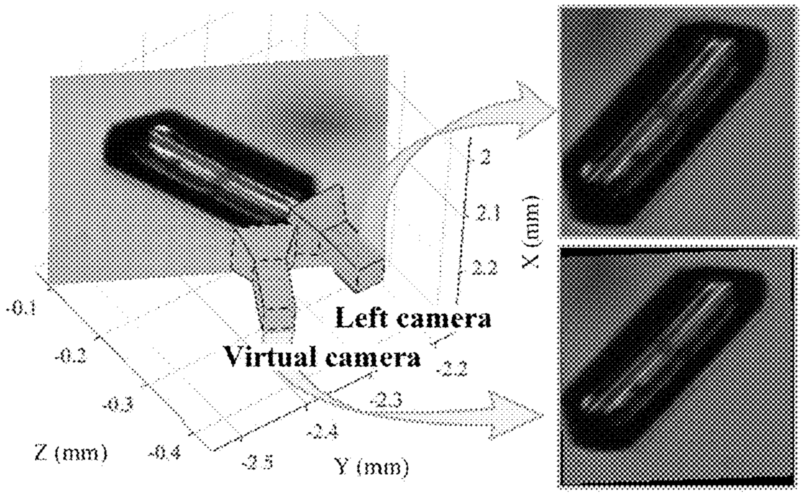
FIGS. 12(*a*)-12(*b*) are schematic diagrams of a virtual imaging process from binocular cameras to a virtual camera in the present invention, FIG. 12(*a*) shows a virtual imaging result corresponding to an image captured by a left camera, and FIG. 12(*b*) shows a virtual imaging result corresponding to an image captured by a right camera.
Figure 12B:
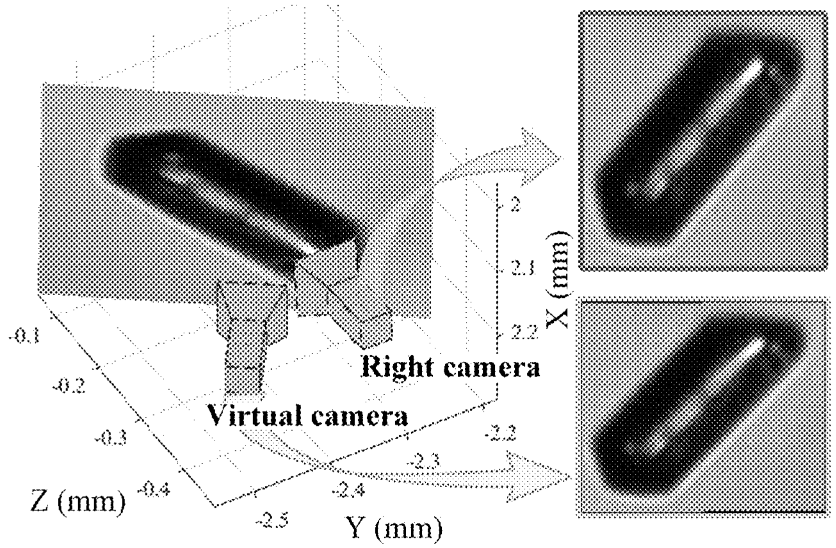

FIGS. 12(*a*)-12(*b*) show virtual imaging from the left and right cameras to the virtual camera. In FIG. 12(*a*), the right camera represents the position and the direction of a real left camera in the world coordinate system. The image shot by the left camera is represented by the image in the upper right corner. The image in the three-dimensional space represents the projection of the left camera image on the virtual plane. The left camera represents the position and the direction of the virtual camera perpendicular to the crystal surface in the world coordinate system. The image shot by the virtual camera is represented by the image in the lower right corner.

(5) Consistency Evaluation of Reconstruction Results:

The homography transformation in (4) above provides mapping from the camera imaging plane to the virtual imaging plane. A real projection from a spatial object to the camera imaging plane belongs to a three-dimensional orthogonal projection. In other words, a projection from the camera plane to the virtual plane can only accurately restore a part in the space that overlaps with the virtual imaging plane. The virtual images obtained by the homography transformation of the above left and right camera images to the same virtual plane should be consistent. To evaluate the accuracy of the three-dimensional reconstruction results, the present invention proposes a method for overlapping and comparing virtual images obtained by left and right cameras.

According to formula (2-27), the projection of a crystal image recovered by the left camera image on the virtual plane is $$\begin{bmatrix} \tilde{u}_c^L \\ \tilde{v}_c^L \\ 1 \end{bmatrix} = \tilde{H}_v^L \begin{bmatrix} u_c^L \\ v_c^L \\ 1 \end{bmatrix} \quad (2\text{-}28)$$

Similarly, the projection of the right camera is calculated as $$\begin{bmatrix} \tilde{u}_c^R \\ \tilde{v}_c^R \\ 1 \end{bmatrix} = \tilde{H}^R \begin{bmatrix} u_c^R \\ v_c^R \\ 1 \end{bmatrix} \quad (2\text{-}29)$$

Therefore, the rectified projection of the crystal image on the virtual plane can be $$I_V(\tilde{u}_c, \tilde{v}_c) = I_V^L(\tilde{u}_c, \tilde{v}_c) \cap I_V^R(\tilde{u}_c, \tilde{v}_c) \quad (2\text{-}30)$$

where $$I_V^L \text{ and } I_V^R$$

are images projected onto the virtual plane from the left and right cameras respectively.

An overlap ratio of the images projected from the left and right camera images onto the virtual plane can be calculated as follows $$O_V = \text{sum}(I_V) / \text{sum}(I_V^L \cup I_V^R) \quad (2\text{-}31)$$

If the overlap ratio $O_v$ is less than a threshold such as 0.9, the virtual projection of three-dimensional reconstruction is considered incorrect, and therefore the projection result is invalid.

FIG. 12(*b*) shows virtual imaging from the right camera to the virtual camera. The camera on the right represents the right camera, and the image at the upper right corner is captured by the right camera. The left camera represents the virtual camera, and the image at the lower right corner represents the projection of the virtual camera. It should be noted that in FIGS. 12(*a*) and (*b*), the positions of the virtual cameras are unique and the same.

Figure 13:
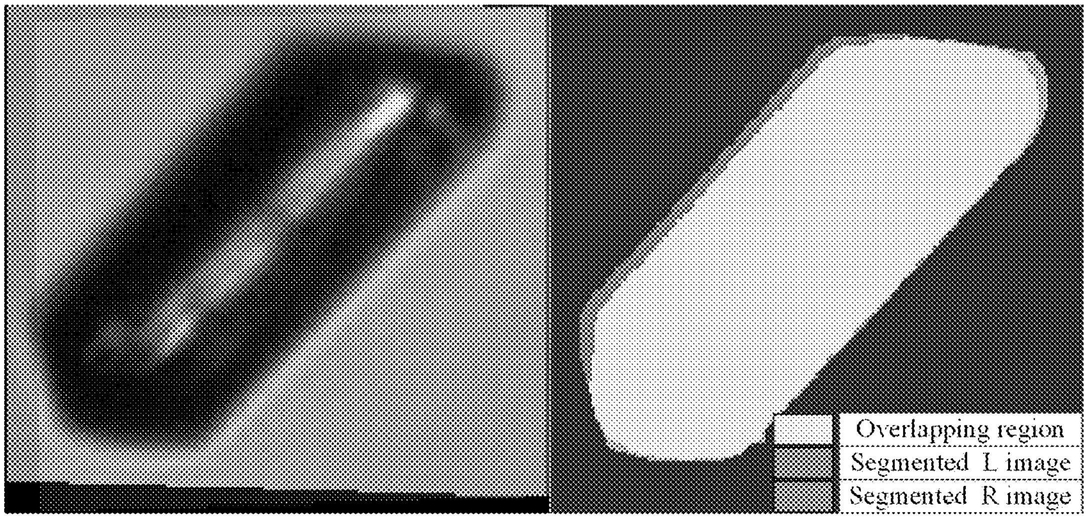
FIG. 13 is a schematic diagram of consistency evaluation of crystal reconstruction results of the present invention, the left figure is a superimposed composite view of virtual images of a left camera and a right camera, and the right figure is a composite view of binary segmentation results of the virtual images from the left camera and the right camera.

FIG. 13 shows the combination result of the virtual imaging of the virtual cameras constructed by the left and right cameras. It can be seen that slight non-overlap exists at the left edge of the crystal image, which is caused by an error in the thickness of the crystal shape. In general, the consistency is good, with an overlap ratio of 96.65%, and further three-dimensional grain size measurement can be conducted.

(6) Statistical Measurement Based on Virtual Images:

Since the contour of a rod-like crystal image obtained in an real crystallization process is not a rectangle in the strict sense, the present invention proposes a method for statistically measuring the length and the width of a single crystal, which measures the mean, median or maximum values of the length and the width, and the maximum projected area through in situ binocular image segmentation in the crystallization process and reconstruction of the virtual imaging image of each crystal.

Rotation angles around z-axis between the virtual left (or right) plane and the left (or right) camera coordinate system is defined as follows $$\begin{cases} \theta_Z^L = \arctan\left(r_{21}^L / r_{11}^L\right) \\ \theta_Z^R = \arctan\left(r_{21}^R / r_{11}^R\right) \end{cases} \tag{2-32}$$

Therefore, an angle between the spindle of the rod-like image projected onto the virtual plane and the vertical direction of the virtual image is expressed as $$\theta_Z = \left(\theta_Z^L + \theta_P^L + \theta_Z^R + \theta_P^R\right) / 2 \tag{2-33}$$

where $$\theta_P^L \text{ and } \theta_P^R$$

are crystal principal axis directions detected by YOLOv8-Obb network respectively.

The two-dimensional coordinate transformation of rotating the virtual imaging image by $\theta_Z$ can be expressed as $$\begin{bmatrix} \hat{u}_c \\ \hat{v}_c \end{bmatrix} = \begin{bmatrix} \cos\theta_Z & -\sin\theta_Z \\ \sin\theta_Z & \cos\theta_Z \end{bmatrix} \begin{bmatrix} \bar{u}_c \\ \bar{v}_c \end{bmatrix} \tag{2-34}$$

A binary image $I_V$ is rotated by a specific angle through (2-34) to align the main direction of the crystal with v-axis of the binary image $I_V$ to obtain the rotated binary image. Then, orthogonal decomposition projection is performed on the rotated binary image. The sum of pixel values along rows and columns provides the basic information of size distribution and crystal shapes in the crystal binary image.

The orthogonal decomposition projections of the rotated image along u-axis and v-axis are $$P_U(\hat{u}_v) = \sum_{\hat{v}_v=1}^{N_V} \hat{I}_V(\hat{u}_v, \hat{v}_v) \tag{2-35}$$

$$P_V(\hat{v}_v) = \sum_{\hat{u}_v=1}^{N_U} \hat{I}_V(\hat{u}_v, \hat{v}_v) \tag{2-36}$$

where $P_U$ is one-dimensional length projection data along u-axis, and $N_V$ is the total number of rows of the rotated crystal images; $P_V$ is 1-D width projection data along v-axis, and $N_U$ is the total number of columns of the rotated crystal images.

Therefore, the mean, median or maximum values of the length and the width of each crystal image and area are counted respectively as follows $$L_{mean} = \text{mean}(P_V)/m \tag{2-37}$$

$$L_{median} = \text{median}(P_V)/m \tag{2-38}$$

$$L_{max} = \max(P_V)/m \tag{2-39}$$

$$W_{mean} = \text{mean}(P_U)/m \tag{2-40}$$

$$W_{median} = \text{median}(P_U)/m \tag{2-41}$$

$$W_{max} = \max(P_U)/m \tag{2-42}$$

$$\text{Area} = \frac{1}{m^2} \sum_{\hat{u}_v=1}^{N_U} \sum_{\hat{v}_v=1}^{N_V} \hat{I}_V(\hat{u}_c, \hat{v}_c) \tag{2-43}$$

where m is a magnification of the cameras obtained from camera calibration.

The present invention proposes to take the maximum value in the length projection data $P_U$ as the crystal length to represent the distance of a longest straight line between any two contour points parallel to the crystal spindle, i.e., the calculation result of formula (2-39). Meanwhile, the crystal width is characterized by the median in the width projection data $P_V$ to represent the mean distance of a plurality of repeated straight lines that connect any two contour points perpendicular to the crystal spindle, i.e., the calculation result of formula (2-41).

Figure 14:
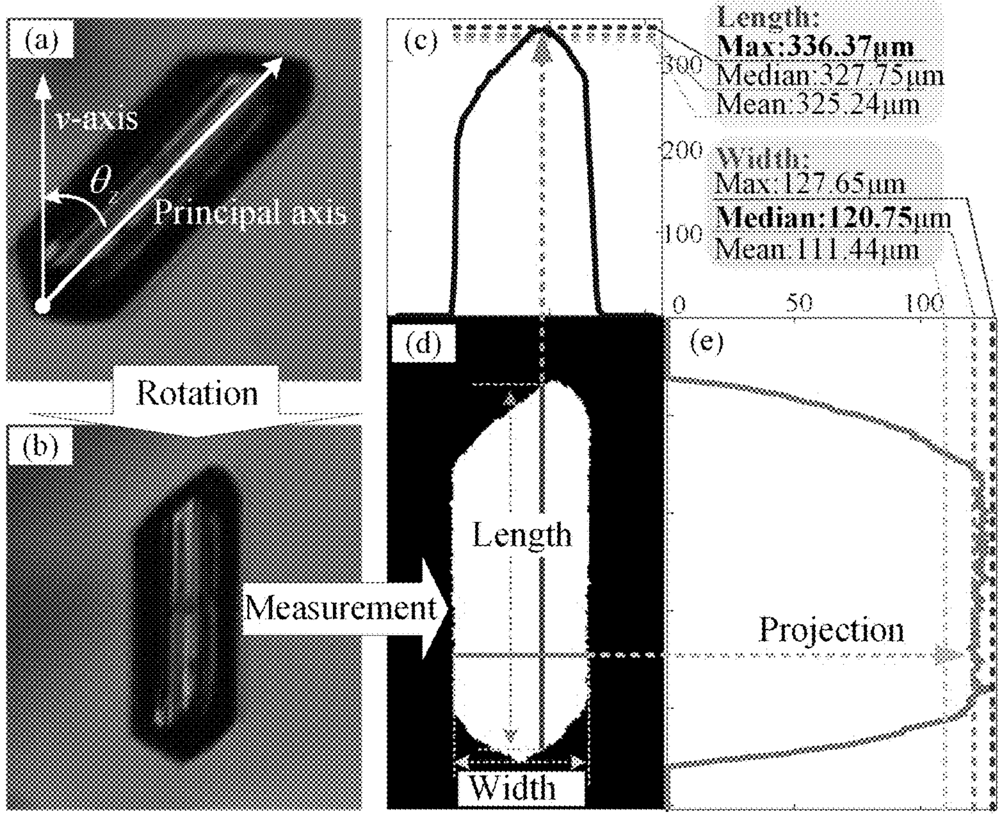
FIG. 14 is a diagram of a three-dimensional size measurement method of rod-like crystal of the present invention: (a) is a virtual imaging image of a crystal: (b) is a virtual imaging image of the crystal after rotation; (c) shows a 1-D length projection along v-axis: (d) is a rotated virtual binary image: (e) shows a one-dimensional width projection along u-axis.

FIG. 14 illustrates the measurement of a regular shape of rod-like crystal based on the orthogonal decomposition projection. The angle $\theta_Z$ between the crystal spindle and the v-axis of the virtual image is determined by (2-32) and (2-33), as shown in (a). Rotating the image by (2-34) will produce the rotated virtual image in (b). The rotated binary image is shown in (d), and the one-dimensional data $P_U$ and $P_V$ representing the length and the width of the crystal calculated from (2-35) and (2-36) are shown in (c) and (e) respectively. In (c), the dotted line represents the maximum length.

Figure 15:
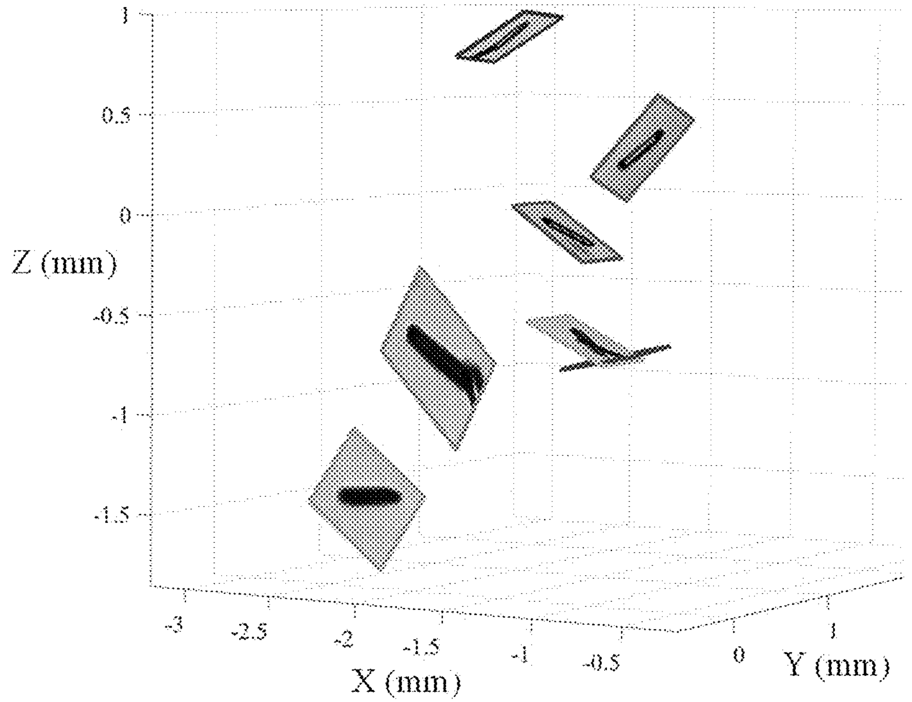
FIG. 15 shows the distribution result of a crystal virtual imaging plane restored by a measurement method in a space in the present invention.

FIG. 15 shows the virtual imaging results of each crystal from the left camera and the spatial positions of the crystals in a group of detection images (as shown in FIGS. 9(*a*)-9(*b*)), which indicates the basic principle and the rationality of the reconstruction method based on the virtual plane proposed by the present invention.

The invention claimed is:

1. A method for real-time detection of length and width size distribution of a crystal population in a glass crystallizer by binocular telecentric cameras, wherein the method is implemented based on a non-contact high-resolution backlit calibration pole to ensure that two telecentric cameras synchronously collect images of a crystal solution in a reactor, thereby measuring the three-dimensional size of crystals; the backlit calibration pole is composed of a light-emitting diode (LED), a ceramic calibration plate printed with a checkerboard pattern, a reflecting prism, an optical fiber and a stainless steel sheath; a light ray emitted by the LED at the top of the backlit calibration pole is guided to the reflecting prism at the bottom of the backlit calibration pole through the optical fiber, and the reflecting prism reflects the light ray vertically to a back surface of the ceramic calibration plate engraved with the checkerboard pattern; reflected light provides illumination for the shooting of two telecentric cameras; the backlit calibration pole is inserted into the glass crystallizer and rotated clockwise or counterclockwise along a pivot to perform in situ calibration; and the backlit calibration pole can be assembled into different sizes to apply to the in situ calibration of the crystallizers with different volumes;

the images are synchronously collected in real time by placing a telecentric camera at two different angles respectively outside the reactor; the images are called binocular images and comprise a left view and a right view; for the poses of binocular cameras, a two-step in situ stereo imaging calibration model is established, comprising calculating the closed-loop solution of camera parameters to obtain the initial values of model parameters and subsequently using optimization algorithms to seek optimal camera model parameters; for the collected binocular images, an analysis method for crystal image matching is proposed, comprising image preprocessing, point of interest detection, feature matching and mismatch removal; and after key length and width corner points are detected by using the contour features of all crystals, the three-dimensional reconstruction of the length and width corner points is conducted for each matched crystal through a calibrated stereo imaging model, so as to quantitatively evaluate its three-dimensional size.

2. The method for real-time detection of length and width size distribution of the crystal population in the glass crystallizer by binocular telecentric cameras according to claim 1, wherein step 1, stereo imaging calibration the projection of a telecentric camera imaging model, i.e., point $P(x_w, y_w, z_w)$ in a world coordinate system to a pixel coordinate system $P(u, v)$, is expressed as $$\begin{bmatrix} u \\ v \\ 1 \end{bmatrix} = \underbrace{\begin{bmatrix} m & 0 & 0 \\ 0 & m & 0 \\ 0 & 0 & 1 \end{bmatrix}}_{M} \left[ \underbrace{\begin{bmatrix} r_{11} & r_{12} & r_{13} \\ r_{21} & r_{22} & r_{23} \\ r_{31} & r_{32} & r_{33} \end{bmatrix}}_{R} \begin{bmatrix} x_w \\ y_w \\ z_w \end{bmatrix} + \underbrace{\begin{bmatrix} t_x \\ t_y \\ t_z \end{bmatrix}}_{T} \right] = \begin{bmatrix} mr_{11} & mr_{12} & mt_x \\ mr_{21} & mr_{22} & mt_y \\ 0 & 0 & 1 \end{bmatrix} \begin{bmatrix} x_w \\ y_w \\ 1 \end{bmatrix} \tag{1}$$

where m is an effective magnification factor of a telecentric lens, and R and T are rotation and translation matrices between the two coordinate systems respectively;

(1) monocular camera parameter calibration:

the world coordinates of the planar calibration plate can be associated with captured image coordinates through a homography matrix H, with a relationship as follows:

$$\begin{bmatrix} u \\ v \\ 1 \end{bmatrix} = \begin{bmatrix} mr_{11} & mr_{12} & mt_x \\ mr_{21} & mr_{22} & mt_y \\ 0 & 0 & 1 \end{bmatrix} \begin{bmatrix} x_w \\ y_w \\ 1 \end{bmatrix} = \underbrace{\begin{bmatrix} h_{11} & h_{12} & h_{13} \\ h_{21} & h_{22} & h_{23} \\ 0 & 0 & 1 \end{bmatrix}}_{\text{homography matrix } H} \begin{bmatrix} x_w \\ y_w \\ 1 \end{bmatrix} \tag{2}$$

for the convenience of analysis, Euler angles are introduced to describe the rotation matrix $R(\alpha, \beta, \theta)$, and $\alpha$, $\beta$, and $\theta$ are rotation angles around X-axis, Y-axis, and Z-axis of the coordinate system respectively; corresponding elements of the rotation matrix are described as:

$$\begin{cases} r_{11} = \cos(\beta)\cos(\theta) \\ r_{12} = \cos(\beta)\sin(\theta) \\ r_{21} = \cos(\theta)\sin(\beta)\sin(\alpha) - \cos(\alpha)\sin(\theta) \\ r_{22} = \sin(\theta)\sin(\beta)\sin(\alpha) - \cos(\theta)\cos(\alpha) \end{cases} \tag{3}$$

by making the corresponding elements of a 3×3 matrix in (2) equal, the following equation can be easily established:

$$\begin{cases} m\ \cos(\beta)\cos(\theta) = h_{11} \\ m\ \cos(\beta)\sin(\theta) = h_2 \\ m(\cos(\theta)\sin(\beta)\sin(\alpha) - \cos(\alpha)\sin(\theta)) = h_{21} \\ m(\sin(\theta)\sin(\beta)\sin(\alpha) - \cos(\theta)\cos(\alpha)) = h_{22} \end{cases} \tag{4}$$

where $\alpha$, $\beta$ and $\theta$ are the rotation angles within the range of $(-\pi/2, \pi/2)$; in addition, the effective magnification factor is defined as a positive value; the solution of the above equation is:

$$\begin{cases} m = \sqrt{0.5\left(-b + \sqrt{b^2 - 4c}\right)} \\ \theta = \arctan(h_{12} / h_{11}) \\ \beta = \pm\arccos\left(\sqrt{h_1^2 + h_{12}^2} \Big/ m\right) \\ \alpha = \arcsin\left(\dfrac{h_{22}h_{12} + h_{21}h_1}{m\ \sin\beta\sqrt{h_1^2 + h_{12}^2}}\right) \end{cases} \tag{5}$$

where $$b = -\left(h_{11}^2 + h_{12}^2 + h_{21}^2 + h_{22}^2\right), \text{ and } c = (h_{11}h_{22} - h_{12}h_{21})^2;$$

the translation matrix $T(t_x, t_y)$ is calculated as:

$$\begin{cases} t_x = h_{13} / m \\ t_y = h_{23} / m \end{cases} \tag{6}$$

therefore, the effective magnification factor m and the Euler angle $\theta$ can be uniquely determined; however, the Euler angles $\alpha$ and $\beta$ have two possible signs, as shown in (5); therefore, a single-camera coordinate system may have two ambiguous postures related to the world coordinate system, while a binocular camera system may have four ambiguous postures; and recovering the real Euler angles $\alpha$ and $\beta$ is a key to a calibration method of the system;

in the calibration process, the calibration pattern is positioned in a specific angle order (either clockwise or counterclockwise) around the $Y_w$-axis for image snapshotting; therefore, it is observed that the placement angle of the calibration pattern is changed to increase or decrease successively; meanwhile, an angle of the camera coordinate system relative to the rotation Euler angle β of the world coordinate system also monotonically increases or decreases; for analysis simplicity, it is assumed that the calibration pattern is rotated clockwise around the $Y_w$-axis, $$m = \frac{1}{N}\sum m^k, k = 1, 2, \ldots N \tag{7}$$

considering that an real rotation angle β is a monotonically increasing sequence, the absolute value of β may present a local minimum point or maintain a monotonic trend; calculation of the absolute value of angle sequence can check whether there is the local minimum point; if there are multiple local minimum points or local maximum points, the calibration conditions are not met; however, if prescribed conditions are met, it can be inferred that the extreme points occur near a minimum value of a discrete sequence, resulting in $$k^e = \arg\min_k |\beta^k|, k = 1, 2, \ldots, N \tag{8}$$

through a number of discrete $\beta^k$, the extremum point could be determined in the vicinity of the minimum value, such as the left- or right-side of the minimum value; because the rotation angle β is monotonically increasing, except a sign of the minimum point, the sign is restored by the following equation:

$$\hat{\beta}^k = \begin{cases} -|\beta^k|, & k < k^e \\ |\beta^k|, & k > k^e \end{cases}, k = 1, 2, \ldots, k^e - 1, k^e + 1, \ldots, N \tag{9}$$

the rotation angle α is restored by the following formula:

$$\hat{\alpha}^k = \frac{\hat{\beta}^k}{\beta^k}\alpha^k, k = 1, 2, \ldots, k^e - 1, k^e + 1, \ldots, N \tag{10}$$

(2) parameter calibration of stereo vision system:

the essence of binocular vision calibration is to obtain a relative positional relationship between two cameras; the coordinate positional relationship of left and right cameras is described by the rotation matrix $R_C$ and a translation vector $T_C$, that is:

$$\begin{bmatrix} x_c^R \\ y_c^R \\ z_c^R \end{bmatrix} = R_R(R_L)^{-1}\begin{bmatrix} x_c^L \\ y_c^L \\ z_c^L \end{bmatrix} + T_R - R_C T_L = R_C\begin{bmatrix} x_c^L \\ y_c^L \\ z_c^L \end{bmatrix} + T_C \tag{11}$$

where $R_L$ and $T_L$, and $R_R$ and $T_R$ are rotation matrices and transfer vectors related to the world coordinate system and left and right camera coordinate systems respectively;

for each pair of calibrated images, the external matrices of the left and the right cameras undergo changes, while the relative rotation matrix $R_C$ between the left and the right cameras remains invariant; and the $R_C$ obtained from the k-th pair of calibrated images is expressed by the Euler angles as $$R_C^k(\alpha_C^k, \beta_C^k, \theta_C^k) = R_R^k\left(\hat{\alpha}_R^k, \hat{\beta}_R^k, \hat{\theta}_R^k\right)R_L^k\left(\hat{\alpha}_L^k, \hat{\beta}_L^k, \theta_L^k\right)^{-1} \tag{12}$$
$$R_C^k\left(\hat{\alpha}_R^k - \hat{\alpha}_L^k, \hat{\beta}_R^k - \hat{\beta}_L^k, \theta_R^k - \theta_L^k\right)$$

where $\alpha_C$, $\beta_C$ and $\theta_C$ are rotation angles around X-axis, Y-axis and Z-axis of the left camera coordinate system;

the rotation Euler angles $\hat{\alpha}_L$, $\hat{\beta}_L$, $\vec{\theta}_L$ and $\hat{\alpha}_R$, $\hat{\beta}_R$, $\vec{\theta}_R$ represent external parameters $R_L$ and $R_R$ in the left and right camera coordinate systems; the superscript k represents that the data are obtained from the k-th set of calibrated images;

the Euler angles $\alpha_C$, $\beta_C$ and $\theta_C$ obtained from N pairs of different calibrated images are optimized:

$$\alpha_C = \frac{1}{N_k}\sum \hat{\alpha}_R^k - \hat{\alpha}_L^k, k \in \{1, 2, \ldots N\} - \{k_L^e, k_R^e\} \tag{13}$$
$$\beta_C = \frac{1}{N_k}\sum \hat{\beta}_R^k - \hat{\beta}_L^k, k \in \{1, 2, \ldots N\} - \{k_L^e, k_R^e\}$$
$$\theta_C = \theta_C = \frac{1}{N}\sum \theta_R^k - \theta_L^k, k = 1, 2, \ldots N$$

where $N_k$ represents the number of variables in a calibrated image set;

the representation form of the calculated Euler angle of the rotation matrix is converted into a matrix representation form $R_C$, and $T_C$ is calculated according to (11) to complete stereo calibration work;

step 2, simplified stereo rectification epipolar rectification plays an important role in precise stereo matching, and simplifies the two-dimensional search of matching points to one-dimensional search; in telecentric stereo vision, the existing methods use a 3×4 matrix for epipolar rectification; in fact, from the perspectives of geometry and physics, rectification parameters can be further simplified to a 3×3 homography matrix, which is more convenient for computer-aided image analysis; a specific method is as follows:

representing the projections of point P from the world coordinate system to left and right camera pixel coordinate systems $p_L$ and $p_R$ respectively as $$\begin{bmatrix} p_L \\ 1 \end{bmatrix} = \mathrm{diag}(m_L\ m_L\ 1)\begin{bmatrix} R_{L2\times2} & T_{L2\times1} \\ 0_{1\times2} & 1 \end{bmatrix}\begin{bmatrix} P_{2\times1} \\ 1 \end{bmatrix} = H_L\begin{bmatrix} P_{2\times1} \\ 1 \end{bmatrix} \tag{14}$$
$$\begin{bmatrix} p_R \\ 1 \end{bmatrix} = \mathrm{diag}(m_R\ m_R\ 1)\begin{bmatrix} R_{R2\times2} & T_{R2\times1} \\ 0_{1\times2} & 1 \end{bmatrix}\begin{bmatrix} P_{2\times1} \\ 1 \end{bmatrix} = H_R\begin{bmatrix} P_{2\times1} \\ 1 \end{bmatrix}$$

determining the projections of point P from the world coordinate system to rectified left and right camera pixel coordinate systems respectively as:

$$\begin{bmatrix} \hat{p}_L \\ 1 \end{bmatrix} = \mathrm{diag}(\hat{m}\ \ \hat{m}\ \ 1)\begin{bmatrix} \hat{R}_{L2\times2} & \hat{T}_{L2\times1} \\ 0_{1\times2} & 1 \end{bmatrix}\begin{bmatrix} P_{2\times1} \\ 1 \end{bmatrix} = \hat{H}_L\begin{bmatrix} P_{2\times1} \\ 1 \end{bmatrix} \tag{15}$$

-continued $$\begin{bmatrix}\hat{p}_R\\1\end{bmatrix}=\mathrm{diag}(\hat{m}\ \ \hat{m}\ \ 1)\begin{bmatrix}\hat{R}_{R2\times2} & \hat{T}_{R2\times1}\\0_{1\times2} & 1\end{bmatrix}\begin{bmatrix}P_{2\times1}\\1\end{bmatrix}=\hat{H}_R\begin{bmatrix}P_{2\times1}\\1\end{bmatrix}$$

according to formulas (14) and (15), establishing transformation from original image coordinates to rectified coordinates:

$$\begin{bmatrix}\hat{p}_L\\1\end{bmatrix}\hat{H}_L H_L^{-1}\begin{bmatrix}p_L\\1\end{bmatrix}=H_L^S\begin{bmatrix}p_L\\1\end{bmatrix} \tag{16}$$

$$\begin{bmatrix}\hat{p}_R\\1\end{bmatrix}\hat{H}_R H_R^{-1}\begin{bmatrix}p_R\\1\end{bmatrix}=H_R^S\begin{bmatrix}p_R\\1\end{bmatrix}$$

step 3, reconstruction and measurement (1) three-dimensional reconstruction:

for a telecentric stereo vision system, proposing an improved three-dimensional reconstruction method for light ray intersection based on analytical solutions;

firstly, constructing the position equations of each ray of $$(x_L^c, y_L^c, z_L^c) \text{ and } (x_R^c, y_R^c, z_R^c)$$

through matching points on left and right physical image planes respectively;

$$\frac{(x_l - x_L^c)}{d_L^x}=\frac{(y_l - y_L^c)}{d_L^y}=\frac{(z_l - z_L^c)}{d_L^z}=\tau_L \tag{17}$$

$$\frac{(x_r - x_R^c)}{d_R^x}=\frac{(y_r - y_R^c)}{d_R^y}=\frac{(z_r - z_R^C)}{d_R^z}=\tau_R \tag{18}$$

where $(x_l, y_l, z_l)$ represents the coordinate of any point on a left image plane light ray;

$$(x_L^c, y_L^c, z_L^c)$$

represents the coordinate of the matching point on the left physical image plane;

$$(d_L^x, d_L^y, d_L^z)$$

represents the unit vector of the direction of a left camera optical axis; $\tau_L$ is a light ray coefficient of a left camera; $(x_r, y_r, z_r)$ represents the coordinate of any point on a right image plane light ray;

$$(x_R^c, y_R^c, z_R^c)$$

represents the coordinate of the matching point on the right physical image plane;

$$(d_R^x, d_R^y, d_R^z)$$

represent the unit vector of the direction of a right camera optical axis; $\tau_R$ is a light ray coefficient of a right camera; if the computed points on the physical image plane and the location equations of the above rays are precise, there exist only one intersection point between the left and right rays for each sampled point on the object surface, However, due to the existence of noise, the left and right light rays may not intersect; to find an optimal intersection point, two points closest to the left ray and the right ray are calculated respectively; and through the calculation of the analytical solutions, the coefficient of the left ray when taking the position of the closest point can be obtained as:

$$\begin{cases}\tau_L=\dfrac{AD+BE}{CD-BF}\\ \tau_R=\dfrac{CE+FA}{CD-BF}\end{cases} \tag{19}$$

where $$A=x_R^c d_L^x+y_R^c d_L^y+z_R^c d_L^z-x_L^c d_L^x-y_L^c d_L^y-z_L^c d_L^Z \tag{20}$$

$$B=d_R^x d_L^x+d_R^y d_L^y+d_R^z d_L^z$$

$$C=d_L^{x2}+d_L^{y2}+d_L^{z2}$$

$$D=d_R^{x2}+d_R^{y2}+d_R^{z2}$$

$$E=x_L^c d_R^x+y_L^c d_R^y+Z_L^c d_R^z-x_R^c d_R^x-y_R^c d_R^y-z_R^c d_R^z$$

$$F=d_R^x d_L^x+d_R^y d_L^y+d_R^z d_L^z$$

correspondingly, calculating the coordinate of the reconfiguration point by the following formula:

$$\begin{bmatrix}x_w\\y_w\\z_w\end{bmatrix}=\frac{1}{2}\left(\begin{bmatrix}x_L^c\\y_L^c\\z_L^c\end{bmatrix}+\tau_L\begin{bmatrix}d_L^x\\d_L^y\\d_L^z\end{bmatrix}\right)+\frac{1}{2}\left(\begin{bmatrix}x_R^c\\y_R^c\\z_R^c\end{bmatrix}+\tau_R\begin{bmatrix}d_R^x\\d_R^y\\d_R^z\end{bmatrix}\right) \tag{21}$$

(2) crystal image matching and measurement:

firstly, rectifying the images through a rectification method in step 2, and quickly matching crystal images through one-dimensional search; then, obtaining a length feature point pair by a distance from a contour to a center point of the contour, connecting the length feature point pair to obtain a crystal spindle, and calculating the projection of the contour on the spindle to obtain a plurality of width feature point pairs; then, matching the feature point pairs through epipolar constraints and calculating the three-dimensional spatial coordinates of feature points; finally, taking a distance between the length feature points as a crystal length, voting distances among a plurality of width feature points, and selecting the distance of the width feature point with a highest occurrence frequency as a crystal width to complete the measurement of the length and width sizes of the crystals.

* * * * *